United States Patent
Muraoka

(10) Patent No.: US 6,580,748 B1
(45) Date of Patent: Jun. 17, 2003

(54) SPREAD SPECTRUM COMMUNICATION METHOD AND SPREAD SPECTRUM COMMUNICATION APPARATUS

(75) Inventor: Shinya Muraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/394,607

(22) Filed: Sep. 13, 1999

(30) Foreign Application Priority Data

Sep. 11, 1998 (JP) .......................................... 10-258090

(51) Int. Cl.[7] ................................................ H04B 1/38
(52) U.S. Cl. ...................................................... 375/141
(58) Field of Search ............................... 375/140, 141, 375/142, 145, 149, 150, 305

(56) References Cited

U.S. PATENT DOCUMENTS

| | | | | |
|---|---|---|---|---|
| 4,847,869 A | * | 7/1989 | Labedz et al. ................. | 375/85 |
| 5,689,525 A | * | 11/1997 | Takeishi et al. ............ | 375/206 |
| 5,867,489 A | * | 2/1999 | Hershey et al. ............. | 370/324 |
| 5,936,570 A | * | 8/1999 | Ghazvinian et al. ......... | 342/354 |

FOREIGN PATENT DOCUMENTS

| | | | | |
|---|---|---|---|---|
| JP | 63-84218 | 4/1988 | ............ | H04J/13/00 |
| JP | 6-204979 | 7/1994 | ............ | H04J/13/00 |
| JP | 6-276176 | 9/1994 | ............ | H04J/13/00 |
| JP | 7-177126 | 7/1995 | ............ | H04J/13/04 |
| JP | 8-65264 | 3/1996 | ............ | H04J/13/04 |
| JP | 10-163995 | 6/1998 | ............ | H04J/3/00 |
| JP | 10-224323 | 8/1998 | ............ | H04J/13/04 |

OTHER PUBLICATIONS

Japanese Office Action issued Sep. 14, 1999 in a related application with English translation of relevant portions.
Japanese Office Action issued Apr. 25, 2000 in a related application with English translation of relevant portions.

* cited by examiner

Primary Examiner—Chi Pham
Assistant Examiner—Dung X. Nguyen
(74) Attorney, Agent, or Firm—Dickstein, Shapiro, Morin & Oshinsky, LLP

(57) ABSTRACT

A UW multiplexing circuit multiplexes a fixed pattern over the leading edge of each frame of transmit data. A spreading code generating circuit generates spreading codes TP1 at a timing synchronized with the frame. A spreading circuit spread-modulates data from the UW multiplexing circuit with the spreading codes TP1. A correlation detecting circuit has spread-modulated fixed patterns as multiplication coefficients, and detects correlations between spread-modulated fixed patterns in received data. A despreading code generating circuit supplies, if a fixed pattern is detected, the leading code of despreading codes RP1. A despreading circuit despread-modulates the receive data with the despreading codes RP1. As a result, the spread spectrum communication apparatus according to the invention is capable of setting the code length and the bandwidth expansion factor independent of each other, and thereby enhancing the performance to detect correlated values.

30 Claims, 13 Drawing Sheets

SPREAD SPECTRUM COMMUNICATION METHOD AND SPREAD SPECTRUM COMMUNICATION APPARATUS

BACKGROUND OF THE INVENTION

Field of the Invention

The present invention relates to a spread spectrum communication method and a spread spectrum communication apparatus suitable for application to mobile radio communication or the like.

Along with an increase in radio communication stations, the spread spectrum communication system, which is relatively immune from noise and interference, is attracting extensive interest. The spread spectrum communication system is a communication formula whereby the spectrum bandwidth is intentionally expanded by modulating signals, which have undergone usual data modulation, such as PSK or QAM, with a high speed sequence of codes known as spreading codes, and the coding rate of these spreading codes is called the chip rate fc. The chip rate fc has a relationship to the coding rate of the transmit data to be spread, i.e. the bit rate fb, of BW=fc/fb (BW is an integer), and this integral value BW is called the bandwidth expansion factor.

In recent years, techniques to make the aforementioned chip rate fc for communication systems using spread spectrum communication have been proposed. For instance, the Japanese Patent Laid-open No. 8-065264 discloses a method by which, although a plurality of receiving stations use the same spreading codes, each receiving station is enabled, by making the chip rate fc variable, to extract only desired signals by detecting correlations and performing despreading at the same chip rate fc as the counterpart transmitting station.

FIG. 12 is a block diagram illustrating the configuration of the receiving section of the spread spectrum communication apparatus proposed in the Japanese Patent Laid-open No. 8-065264. In this system, the mutually opposite transmitting and receiving stations can choose the type of code from a selective spreading code generator 65 and the chip rate from a selective clock generator 66.

Therefore, by predetermining the code type and the chip rate between the transmitting and receiving stations, only signals from the counterpart in the communication can be extracted at the time of despreading even if the code type of an interfering wave coincides because the chip rate is different.

Further, the Japanese Patent Laid-open No. 6-276176 proposes a method by which, with a view to solving the relative distance problem by reducing inter-signal interference at the time of demodulation due to an imbalance in reception field strength of signals from remote stations at a base station, a lower chip rate fc is given to the transmitting side when receive signals of a high field strength are received by the base station and a higher chip rate fc is given to the transmitting side when receive signals of a low field strength are received so as to achieve the best possible uniformization of reception field strength at the base station.

FIG. 13 is a block diagram illustrating the configuration of the CDMA communication system disclosed in the Japanese Patent Laid-open No. 6-276176. Signals from remote stations 71 and 72 are subjected to despread-demodulation by a despread-spectrum demodulating section 74 in a base station 73 and to receive power determination by a receive power detecting section 75. On the basis of the detected receive power, a chip rate determining section 76 and a chip rate notifying section 77 carry out chip rate control over the aforementioned remote stations.

Whereas the benefit of a variable chip rate fc is as described above, making the chip rate fc variable means making the bandwidth expansion factor BW variable, and making the bandwidth expansion factor BW variable provides the following benefits.

(a) By raising the bandwidth expansion factor BW, the S/N ratio of the desired wave after despreading on the receiving side can be improved.

(b) Raising the bandwidth expansion factor BW results in an expanded bandwidth and a corresponding reduction in transmit peak power, which makes possible suppression of interference with other stations.

(c) The bandwidth expansion factor BW can be so set as to optimize the efficiency of frequency utilization of the whole system.

On the other hand, since the S/N ratio of the largest correlated values obtained by a correlator in a receiver is proportional to the code length (the number of chips per period) L [chips] of spreading codes, the correlation detecting performance of the receiver can be improved by extending the code length L.

Now, in the conventional spread spectrum communication system described with reference to FIG. 12 and FIG. 13, 1 period equivalent of spreading codes is always accommodated within 1 information bit, and the following equation holds.

$$L=BW=fc/fb \tag{1}$$

In order to improve the correlation detecting performance of a receiver and make it relatively immune from noise and interference, a method to raise the bandwidth expansion factor BW and another to extend the code length L of spreading codes is conceivable. However, where the code length L and the bandwidth expansion factor BW are always kept equal as in the spread spectrum communication systems according to the prior art, it is impossible to make these factors independently variable.

Especially, the code length L of spreading codes cannot be made independently variable in disregard of the bandwidth expansion factor BW, and in almost every case it is limited by the bandwidth expansion factor BW.

The reason is that the bandwidth expansion factor BW is prevented from being raised beyond a certain level by the need to optimize the efficiency of frequency utilization by the whole system in consideration of the environment of use, spread processing and the limitation of the operating speed of a device performing analog-to-digital (A/D) conversion at a later stage, both on the transmitting side, and despread processing and the limitation of the operating speed of a device performing digital-to-analog (D/A) conversion, both on the receiving side.

Therefore, in the conventional spread spectrum communication systems, where the environment of use or the limitation of devices prevents the bandwidth expansion factor BW from being raised substantially, the code length L of spreading codes is kept short, resulting in poor correlation detecting performance of the receiver.

In order to solve this problem, it is necessary to enable 1 period of spreading codes to span a plurality of information bits. Where 1 period of spreading codes spans N information bits, the following equation holds.

$$N=L/BW \tag{2}$$

What poses a problem here is that the value of N bits is not fixed. Since this value of N bits constitutes an information bit, it is not in a fixed pattern, such as being always "1" or the like. Correlation detection at this time is accomplished as represented by the following equation.

$$C(j) = \frac{1}{L}\sum_{k=0}^{L-1} R(j-k+1) \cdot pn(k) \quad (3)$$

In Equation (3), C(j) represents the correlated value at a time j; R(j), the spread receive signal entered into the correlator at the time j; and pn(k), a despreading code.

If transmit and receive codes are identical in timing, and the values of all of N information bits before the spread are either "1" or "−1", Equation (3) will give a value of "1" or "−1", respectively.

However, if N information bits before the spread randomly include "1" and "−1", the result will vary with the ratio between "1" and "−1" at a given time. If, for instance, "1" and "−1" are included in equal proportions, the result will be "0". As a correlator usually recognizes the peak of correlated values as the coincidence of transmit and receive codes in timing, the correlator is unable to correctly detect coincidence in code timing in such a case.

As described above, spread spectrum communication systems according to the prior art involve the problem that they do not allow the code length L of spreading codes and the bandwidth expansion factor BW to vary independently and, if this problem is to be solved, there will arise another problem that the correlator on the receiving side cannot correctly detect timing coincidence.

SUMMARY OF THE INVENTION

The present invention, attempted to solve the problems noted above, is intended to provide a spread spectrum communication method and a spread spectrum communication apparatus capable of setting the bandwidth expansion factor so as to achieve the optimal efficiency of frequency utilization according to the environment of use while averting the aforementioned problems occurring on the correlator on the receiving side, and permitting the determination of the code length of spreading codes without having to worry about the efficiency of frequency use and the limit of the operating speed of devices.

According to the spread spectrum communication method of the present invention, a fixed pattern is multiplexed over the leading edge of each frame of transmit data; a spreading code is generated at a timing synchronized with each such frame; the transmit data multiplexed with the fixed pattern is spread-modulated with the spreading codes and transmitted to a counterpart station; correlations between spread-modulated signals received from the counterpart station and the same code sequence as the fixed pattern are detected; if the fixed pattern is detected by the correlation detection, a despreading code is generated at a timing synchronized with the frame; and the spread-modulated signals are despread-modulated with such despreading codes. In this way, according to the invention, transmit data over which a fixed pattern is multiplexed are spread-modulated with spreading codes. In this process, there is no need to make the code length L of the spreading codes identical with the bandwidth expansion factor BW after spreading, but the two factors can be set independent of each other. Further, the leading bit of the fixed pattern for frame synchronization and the leading bit of the data immediately after the fixed pattern are multiplied by the first of the spreading codes. On the receiving side, a spread-modulated fixed pattern in receive data is correlatively detected. Upon detection of the fixed pattern, the generation of despreading codes is reset, and the first of the despreading codes is supplied at the next chip.

Further, for the spreading codes, the code length and the bandwidth expansion factor can be set independent of each other.

Also, the ratio between the code length and the bandwidth expansion factor is variable.

Further, a fixed pattern is multiplexed over the leading edge of each frame of transmit data; spreading codes are generated at a timing synchronized with each such frame; the code length and the bandwidth expansion factor of the spreading codes are controlled to prescribed values; the transmit data multiplexed with the fixed pattern is spread-modulated with the spreading codes, and control signals for the code length and the bandwidth expansion factor are transmitted to a counterpart station along with the spread modulation; correlations between spread-modulated signals received from the counterpart station and the same code sequence as the fixed pattern are detected; if the fixed pattern is detected by the correlation detection, a despreading code is generated at a timing synchronized with the frame; the code length and the bandwidth expansion factor of the despreading codes are controlled in accordance with the received control signals; and the spread-modulated signals are despread-modulated with such despreading codes.

Further, the control of the code length and the bandwidth expansion factor is such that at first the bandwidth expansion factor is set to a prescribed optimal value and the code length to a short value, and then the code length is extended on the basis of the reception characteristics of the counterpart station.

A spread spectrum communication apparatus according to the present invention comprises a multiplexing circuit multiplexing a fixed pattern over the leading edge of each frame of transmit data; a spreading code generating circuit for generating spreading codes at a timing synchronized with the frame; a spreading circuit for spread-modulating the transmit data multiplexed with the fixed pattern with the spreading codes and transmitting them to a counterpart station; a correlation detecting circuit for detecting correlations between spread-modulated signals received from the counterpart station and the same code sequence as the fixed pattern; a despreading code generating circuit for generating, if the fixed pattern is detected by the correlation detection, a despreading code at a timing synchronized with the frame; and a despreading circuit for despread-modulating the spread-modulated signals with the despread-modulated signals. Thus, the spreading circuit of the transmitting station spread-modulates the data entered from the multiplexing circuit with spreading codes entered from the spreading codes generating circuit. In this process, there is no need to make the code length L of the spreading codes identical with the bandwidth expansion factor BW after spreading, but the two factors can be set independent of each other. Further, the leading bit of the fixed pattern for frame synchronization and the leading bit of the data immediately after the fixed pattern are multiplied by the first of the spreading codes. On the other hand the correlation detecting circuit of the receiving station correlatively detects a spread-modulated fixed pattern in receive data. Upon detection of the fixed pattern, the despreading code generating circuit is reset, supplies the first of the despreading codes at the next chip, the despreading circuit despread-modulates the receive data with the despreading codes, and restores the data before the spreading.

Further, for the spreading codes, the code length and the bandwidth expansion factor can be set independent of each other.

Also, the ratio between the code length and, the bandwidth expansion factor is variable.

There is further provided a spread spectrum communication apparatus comprising a multiplexing circuit for multiplexing a fixed pattern over the leading edge of each frame of transmit data; a spreading code generating circuit for generating spreading codes at a timing synchronized with the frame; a spreading code control circuit for controlling the code length and the bandwidth expansion factor of the spreading codes to prescribed values; a spreading circuit for spread-modulating the transmit data multiplexed with the fixed pattern with the spreading codes; a modulating/demodulating circuit for transmitting to a counterpart station control signals for the code length and the bandwidth expansion factor along with the spread modulation; a correlation detecting circuit for detecting correlations between spread-modulated signals received from the counterpart station and the same code sequence as the fixed pattern; a despreading code generating circuit for generating, if the fixed pattern is detected by the correlation detection, a despreading code at a timing synchronized with the frame; and a despreading circuit for despread-modulating the spread-modulated signals with the despread-modulated signals, wherein the spreading code control circuit of the transmitting station controls the code length and the bandwidth expansion factor of the spreading codes to prescribed values while the spreading code control circuit of the receiving station controls the code length and the bandwidth expansion factor of the despreading codes on the basis of the control signals that have been received.

DESCRIPTION OF THE PREFERRED EMBODIMENTS

Embodiment 1

Figure 1:
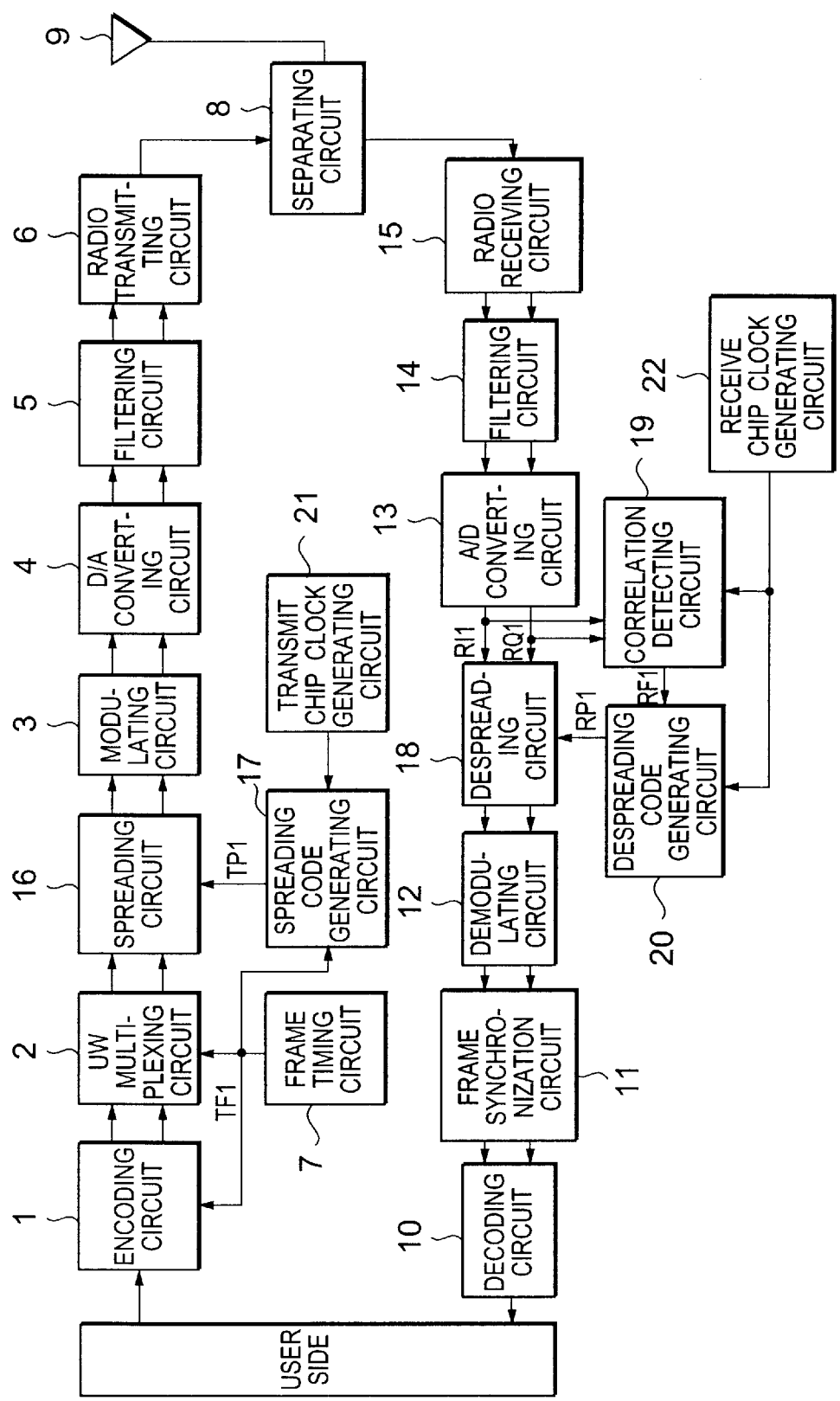
FIG. 1 is a block diagram of a spread spectrum communication apparatus, which is a first preferred embodiment the present invention.
Figure 2:
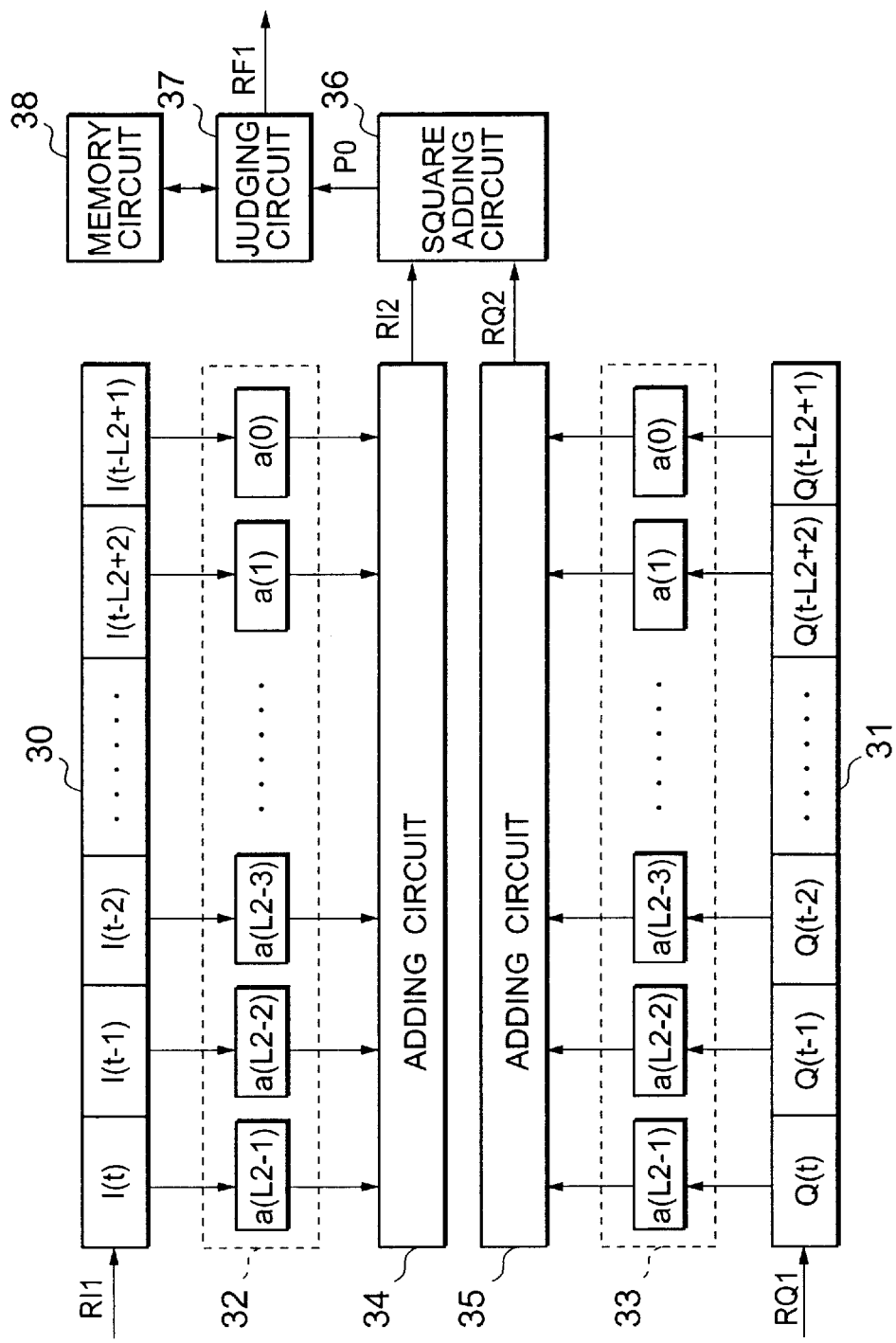
FIG. 2 is a block diagram illustrating the internal configuration of the correlation detecting circuit of the spread spectrum communication apparatus of FIG. 1.

Next will be described preferred embodiments of the present invention in detail with reference to drawings. FIG. 1 is a block diagram of a spread spectrum communication apparatus, which is a first preferred embodiment the invention; FIG. 2, a block diagram illustrating the internal configuration of the correlation detecting circuit of the spread spectrum communication apparatus of FIG. 1; and FIGS. 3 through 5, timing charts for describing actions within the spread spectrum communication apparatus of FIG. 1.

The invention makes it possible to independently set the period of the spreading code TP1 (code length L) and the bandwidth expansion factor BW, indicating the expansion of the bandwidth from before to after spreading in spread spectrum communication. On the transmitting side, codes are spread in synchronism with the frame, while on the receiving side sequences in which the fixed pattern for frame synchronization is spread are correlatively detected.

In FIG. 1, a spreading code generating circuit 17 generates a spreading code TP1 in synchronism with a timing signal TF1 given from a frame timing circuit 7, and provides it to a spreading circuit 16.

The spreading circuit 16 spreads information bits, entered from a UW multiplexing circuit 2, with this spreading code TP1. In this process, there is no need to make the code length L of the spreading codes identical with the bandwidth expansion factor BW after spreading, but the two factors can be set independent of each other.

Further, the leading bit of the fixed pattern (unique word) for frame synchronization and the leading bit of the data immediately after the unique word are multiplied by the first of the spreading codes TP1.

The signals thus spread on the transmitting side are entered into a correlation detecting circuit 19 and a despreading circuit 18 at the receiving station. The correlation detecting circuit 19 correlatively detects the aforementioned spreading unique word and, upon detection provides a timing signal RF1 indicating it to a despreading code generating circuit 20.

The despreading code generating circuit 20 is reset by the entry of the timing signal RF1, supplies the leading code of the sequence of despreading codes RP1 at the next chip, and the despreading circuit 18 despreads the receive data with the code RP1 to restore the pre-spreading data.

As stated above, codes are spread on the transmitting side so that the leading code of the spreading code sequence from the leading one of the data immediately after the unique word, and since, according to the invention, correlations are detected not with spreading codes but with a sequence resulting from the spreading of the unique word with these spreading codes, a sufficiently high S/N ratio can be secured, unaffected by the pattern of the data portion.

Next, the configuration of the spread spectrum communication apparatus of FIG. 1 will be described in detail.

This apparatus transmits what results from conversion on the user side of analog or digital speech signals or data communication signals into digital signals of the baseband frequency range to a counterpart station having a similar apparatus via a radio line.

Further, radio signals received from such a counterpart station are supplied to the user side after conversion into signals of the baseband frequency range, and these baseband signals are converted into analog or digital speech signals or data communication signals on the user side by a predetermined system.

Figure 3:
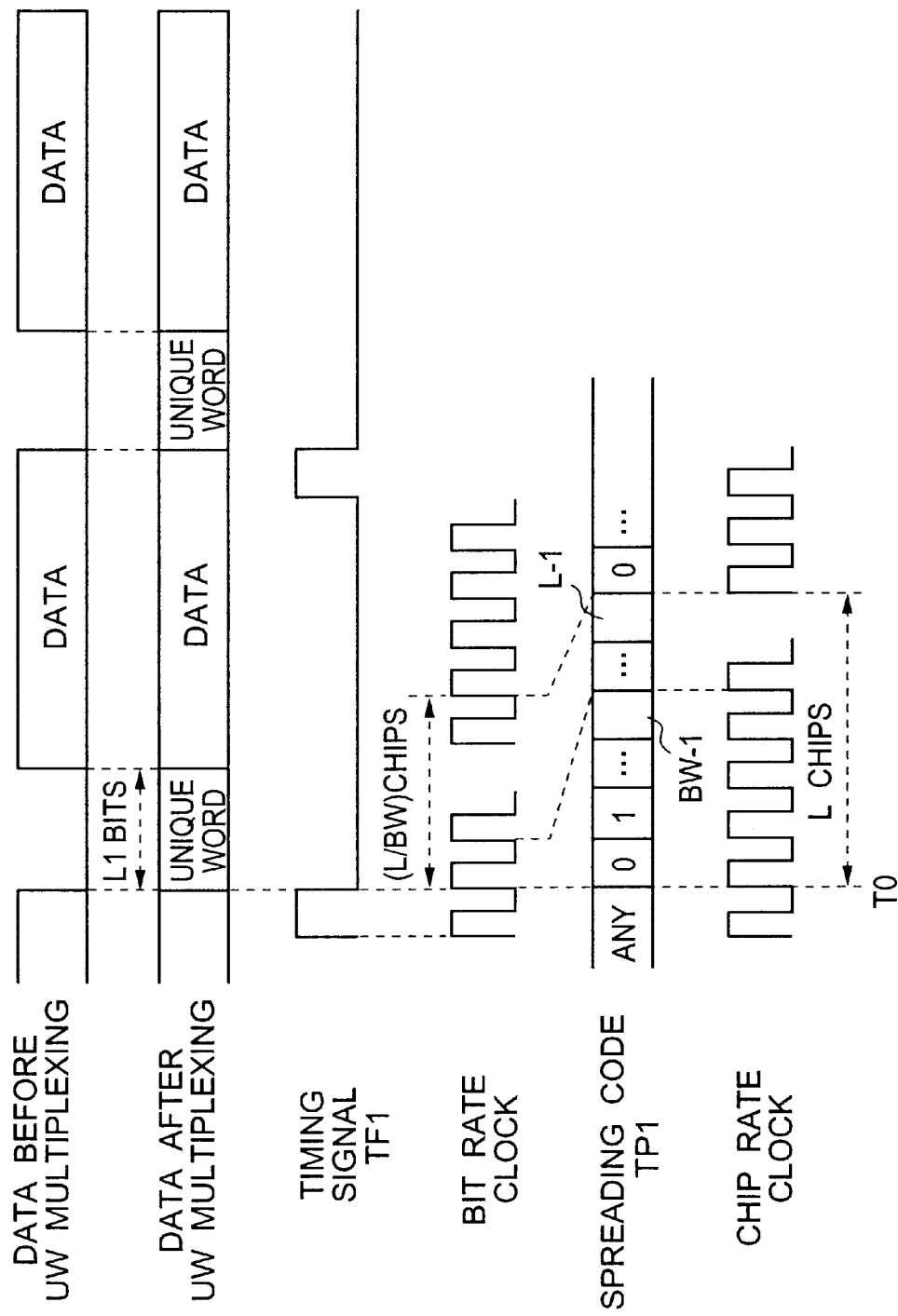
FIG. 3 is a timing chart for describing actions within the spread spectrum communication apparatus of FIG. 1.

The frame composition used on this radio line is illustrated in FIG. 3. The data after UW (unique word) multiplexing exchanged on the radio line consist of data portions for transmitting and receiving data entered from the user side and a fixed pattern (unique word) determined specifically for the radio line for frame synchronization, and the unique word is supposed to be multiplexed at the leading edge of each frame.

An encoding circuit 1 encodes digital signals of the baseband frequency range entered from the user side into a predetermined form.

The UW multiplexing circuit 2 multiplexes the unique word over the encoded data at the timing of the timing signal TF1 supplied from the encoding circuit 1.

The frame timing circuit 7 controls the transmit frame timing, and supplies the aforementioned timing signal TF1 to the encoding circuit 1, the UW multiplexing circuit 2 and the spreading circuit 16.

A transmit chip clock generating circuit 21 generates a clock of a chip rate fc which corresponds to an integral multiple of the bit rate (this is called the bandwidth expansion factor), and supplies this chip rate clock to the spreading code generating circuit 17.

The spreading code generating circuit 17 generates a predetermined spreading code TP1 in synchronism with the chip rate clock from the chip clock generating circuit 21, and supplies it to the spreading circuit 16.

The spreading circuit 16 multiplies the data after multiplexing with the unique word, supplied from the UW multiplexing circuit 2, on both Ich and Qch by the spreading code TP1 at the chip rate, and subjects the data to spectrum spreading.

A modulating circuit 3 subjects the Ich and Qch data, code-spread by the spreading circuit 16, to four-phase phase modulation.

A D/A converting circuit 4, after sampling the signals supplied from the modulating circuit 3 at an integral multiple of the chip rate fc, converts them into analog signals, and supplies the converted signals to a filtering circuit 5.

The filtering circuit 5 applies bandwidth limitation to the analog signals supplied from the D/A converting circuit 4.

A radio transmitting circuit 6 converts into a predetermined frequency on the radio line and amplifies the signals having passed the filtering circuit 5.

A separating circuit 8 supplies radio signals from the radio transmitting circuit 6 to an antenna 9, and the antenna 9 supplies these radio signals to the radio line.

On the other hand, spectrum-spread radio signals transmitted from the counterpart station having an apparatus similar to the one illustrated in FIG. 1 are received by the antenna 9.

The separating circuit 8 provides the radio signals from the antenna 9 to a radio receiving circuit 15. The radio receiving circuit 15 subjects the radio signals to low noise amplification and at the same time to frequency conversion to signals of the baseband range.

A filtering circuit 14 subjects signals supplied from the radio receiving circuit 15 to bandwidth limitation.

An A/D converting circuit 13 samples the signals having passed the filtering circuit 14 at an integral multiple of the chip rate, and supplies to a despreading circuit 18 and a correlation detecting circuit 19 two sequences of sampled digital signals RI1 and RQ1.

A receive chip clock generating circuit 22 generates a clock at the same chip rate fc as on the transmitting side, and supplies this chip rate clock to the correlation detecting circuit 19 and the despreading code generating circuit 20.

Figure 5:
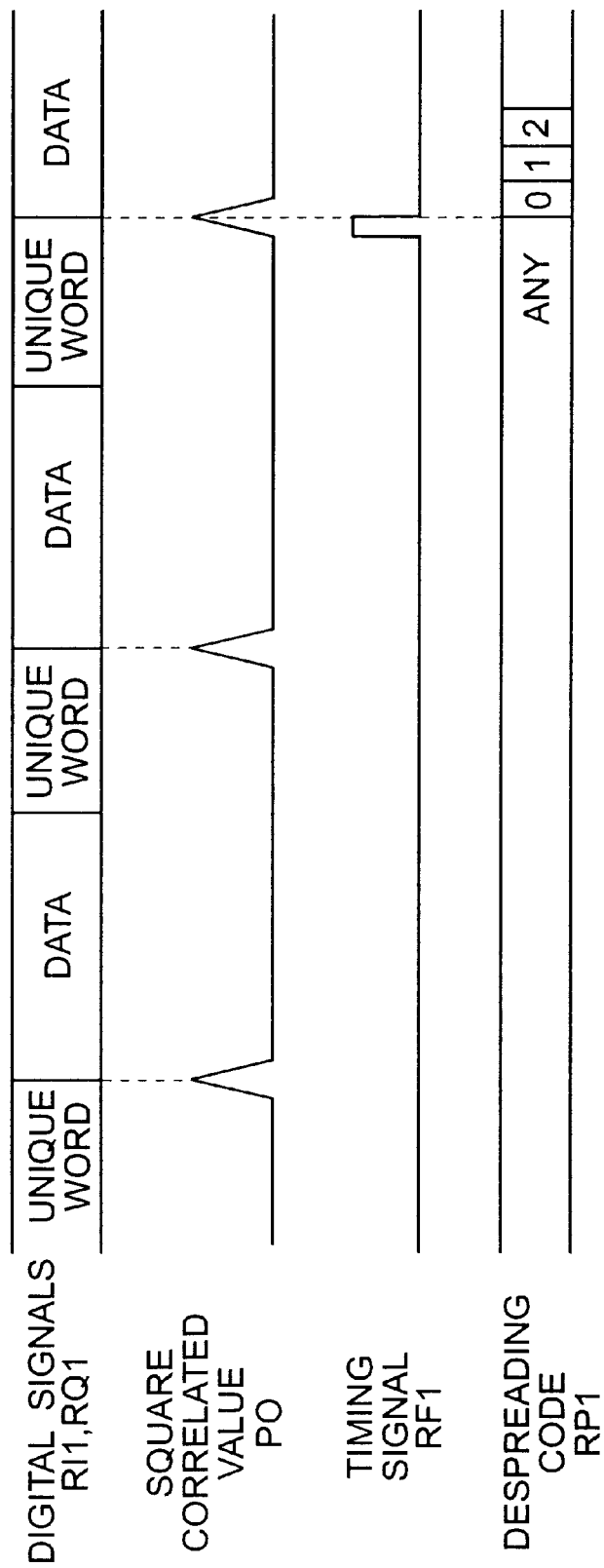
FIG. 5 is still another timing chart for describing actions within the spread spectrum communication apparatus of FIG. 1.

The correlation detecting circuit 19 correlatively detects the spread unique word, after the spreading of the unique word with the spreading code TP1 at the counterpart station and, upon detection of this spread unique word, supplies the timing signal RF1 shown in FIG. 5 to the despreading code generating circuit 20.

Into shift register circuits 30 and 31 of the correlation detecting circuit 19 are entered, as shown in FIG. 2, receive digital signal RI1 and RQ1 from the A/D converting circuit 13 at each chip.

Multiplying circuits 32 and 33 respectively consist of as many multiplying elements a(n) as the registers of the shift register circuits 30 and 31. The outputs of the shift register circuits 30 and 31 are multiplied by the respectively corresponding multiplying elements of the multiplying circuit 32 and 33 at each chip.

All the outputs of the multiplying circuit 32 are added by an adding circuit 34, and the addition result RI2 is supplied to a square adding circuit 36.

Similarly, all the outputs of the multiplying circuit 33 are added by the adding circuit 35, and the addition result RQ2 is supplied to a square adding circuit 36.

The numbers of registers in the shift register circuits 30 and 31 and those of multiplying elements in the multiplying circuit 32 and 33 are equally L1×BW each, where L1 [bits] is the length of the unique word before spreading and BW is the bandwidth expansion factor in code spreading.

The square adding circuit 36 adds the addition results RI2 AND RQ2 after squaring each, and supplies a square correlated value P0, which is the result of the addition, to a judging circuit 37.

The judging circuit 37 analyzes the square correlated value P0, entered at every chip; if it judges that a spread unique word has been detected, generates a timing signal RF1 indicating the detection; and supplies this timing signal RF1 to the despreading code generating circuit 20.

These actions by the judging circuit 37 are accomplished through comparison with records regarding correlation until immediate before, stored in a memory circuit 38, and the judging circuit 37 updates information in the memory circuit 38, if necessary.

Next, the despreading code generating circuit 20 generates despreading codes RP1, which are the same as the sequence of spreading codes used at the counterpart station, in synchronism with the chip rate clock from the receive chip clock generating circuit 22, and gives these despreading codes RP1 to the despreading circuit 18.

The despreading code generating circuit 20, when the timing signal RF1 is entered, is reset as shown in FIG. 5, and generates the leading one of the despreading codes RP1 at the immediately following chip.

The despreading circuit 18 despreads receive digital signals supplied from the A/D converting circuit 13 with the despreading codes RP1 from the despreading code generating circuit 20.

A demodulating circuit 12 demodulates the despread data from the despreading circuit 18.

A frame synchronization circuit 11 detects the leading edge of the frame by detecting a unique word from demodulated data, and supplies to a decoding circuit 10 only the data portions of what is shown in FIG. 3 cleared of the unique word.

The decoding circuit 10 decodes the signals supplied from the frame synchronization circuit 11 by a predetermined system, and transfers them to the user side.

Next will be described the operation of the spread spectrum communication apparatus of FIG. 1.

The digital signals in the baseband frequency range entered from the user side are encoded by an encoding circuit 1 in a predetermined system, and further subjected to serial/parallel conversion into two sequences of data, Ich and Qch, which are supplied to the UW multiplexing circuit 2, where the unique word is multiplexed over them.

In this process, the unique word from the same sequence is multiplexed over the data Ich and Qch at the same timing.

FIG. 3 illustrates the encoded data before the multiplexing of the unique word, the encoded data after the multiplexing of the unique word, and the timing signal TF1 indicating the leading edge of the frame supplied from the frame timing circuit 7. As is seen from these illustrations, the multiplexing of the unique word is accomplished in synchronism with the timing signal TF1.

The data, of both Ich and Qch sequences, after multiplexing of the unique word supplied from the UW multiplexing circuit 2 are subjected at the spreading circuit 16 to code spreading by the spreading code TP1 from the spreading code generating circuit 17.

The spreading code generating circuit 17 reiteratively generates the spreading codes TP1 (from the initial code p(0) to the final code p (L−1)), consisting of L codes as shown in FIG. 3 in synchronism with the chip rate clock supplied from the chip clock generating circuit 21.

To add, in the spreading codes TP1 illustrated in FIG. 3, "0" denotes the code p(0), "1", the code p(1), "BW−1", the code p (BW−1), and "L−1", the code p (L−1), while "ANY" can be any code.

Now, the bit rate being represented by fb, the chip rate by fc, and the bandwidth expansion factor by BW, the bandwidth expansion factor BW is represented by the following equation.

$$BW=fc/fb \qquad (4)$$

In conventional spread spectrum communication systems, as the code length (the number of chips of spreading codes per period) L and the bandwidth expansion factor BW are equal, a 1-bit information bit is always spread by an L-chip code.

Unlike the conventional systems, as the present invention allows the code length L and the bandwidth expansion factor BW to be independently set, as shown in FIG. 3, a 1-bit information bit is spread by a BW-chip code.

Figure 4:
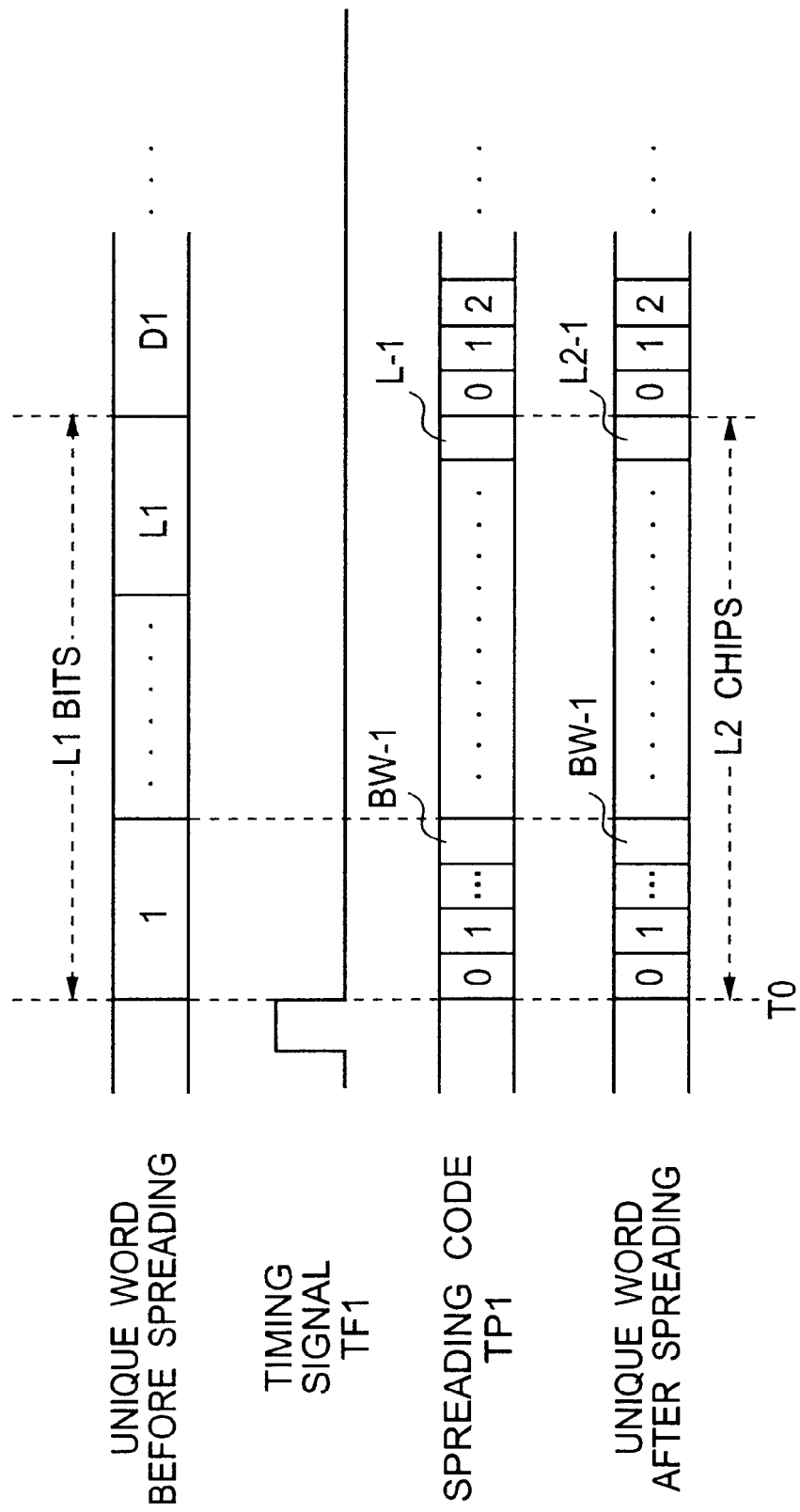
FIG. 4 is another timing chart for describing actions within the spread spectrum communication apparatus of FIG. 1.

Furthermore, as shown in FIGS. 3 and 4, the action of the spreading code TP1 is also synchronized with the timing signal TF1. Now, the falling time of the timing signal TF1 being represented by T0 and the spreading code TP1 at any time other than the time T0 by p(t), the following equations hold for the spreading code TP1:

$$p(T0)=P(0) \qquad (5)$$

$$p(t)=P(k) \qquad (6)$$

where k mod(t−T0, L), and the range of values k can take is 0, 1, 2, ..., L−1, and the value p(t) can take is either +1 or −1. To add, mod(t−T0, L) means the remainder of the division of t−T0 by L.

Equations (5) and (6) indicate that the spreading codes TP1 at the time T0 is set to the leading code p(0) of the spreading code sequence, and the subsequent spreading codes TP1 repeat the sequence of p(0), ..., p(L−1), p(0), p(1) ....

Therefore, as the action of unique word multiplexing is also synchronized with the timing signal TF1, as shown in FIG. 4, the initial bit of the unique word is always spread by the BW-chip spreading codes of p(0), p(1), ..., p(BW−1), and every bit in the unique word and the spreading code TP1 are always in a fixed timing relationship.

The unique word of Ich and Qch before spreading being represented by uw1(m) (where, m=0, 1, ..., L1−1), and the unique word of Ich and Qch after spreading by uw2 (n) (where n=0, 1, ..., L2−1, L2=BW×L1), the following equation holds, in which the unique word length L2 after spreading is an integral multiple of the code length L of the spreading code TP1:

$$uw2(n)=uw1(m) \times p(k) \qquad (7)$$

where k=mod(n, L) and the range of values k can take is 0, 1, 2, ..., L−1, m=int(n/BW), and the value uw1(m), uw2(n) and p(k) can take is either +1 or −1. To add, mod(n, L) means the remainder of the division of n by L, and int(n/BW), an integral value taken by n/BW.

As the final chip of the unique word after spreading, i.e. uw2(L2−1), is generated by the multiplication of uw1(L1−1) and p(L−1), the first bit of the data portion immediately after the unique word is multiplied by the first spreading code p(0).

To add, in FIG. 4, "D1" represents the first bit of the data portion immediately following the unique word; "0" of the unique word before spreading, uw1(0); "L1−1", uw1(L1−1); "0" of the unique word after spreading, uw2(0); "1", uw2(1); "2", uw2(2); "BW−1", uw2(BW−1); and "L2−1", uw2(L2−1).

The Ich and Qch data code-spread by the spreading circuit 16 are subjected to 4-phase phase modulation by the modulating circuit 3, whose output is sampled at an integral multiple of the chip rate by the subsequent D/A converting circuit 4 to be converted into analog signals.

The analog signals supplied from the D/A converting circuit 4 are subjected to bandwidth limitation by the filtering circuit 5, and the signals having passed the filtering circuit 5 are converted to a predetermined radio frequency and amplified in power by the radio transmitting circuit 6, and transmitted to a radio line from the antenna 9 via the separating circuit 8.

On the other hand, radio signals transmitted from the counterpart station are received by the antenna 9, and entered into the receiving circuit 15 via the separating circuit 8. These receive signals are subjected to low noise power amplification and converted into analog signals in the baseband range by the radio receiving circuit 15, and further subjected to bandwidth limitation by the filtering circuit 14.

The A/D converting circuit 13 samples the signals having passed the filtering circuit 14 at an integral multiple of the chip rate to convert them into digital signals. The sampled Ich and Qch receive data are referred to as digital signals RI1 and RQ1.

The receive chip clock generating circuit 22 generates a clock at the same chip rate fc as on the transmitting side.

The digital signals RI1 and RQ1 supplied from the A/D converting circuit 13 are entered into the correlation detecting circuit 19 in synchronism with this chip rate clock, and entered into the shift register circuits 30 and 31, respectively, within the correlation detecting circuit 19.

Data in the shift register circuits 30 and 31 shift rightward in FIG.2 at every chip, so that the latest data are entered into the leftmost register.

The output of the shift register circuit 30 at each chip is multiplied by the corresponding multiplying element a(n) in the multiplying circuit 32 and the product is supplied to the adding circuit 34, while the output of the shift register circuit 31 at each chip is multiplied by the corresponding multiplying element (n) in the multiplying circuit 33, and the product is supplied to the adding circuit 35.

The multiplying element (n) is intended to correlatively detect unique words spread at the counterpart station, and its characteristic can be represented by the following equation in a similar way to Equation (7):

$$a(n) = uw1(m) \times p(n) = uw1(m) \times p(k) = uw2(n) \quad (8)$$

where k=mod(n, L), the range of values k can take is 0, 2, ..., L−1, the range of values n can take is 0, 1, 2, ..., L2−1, and m=int(n/BW).

The data entered into the shift register circuit 30 at the time being represented by I(t), and the data entered into the shift register circuit 31 at the same time by Q(t), the outputs RI2 and RQ2 of the adding circuits 34 and 35 at the time 5 are represented by the following equations, respectively.

$$RI2(t) = \sum_{k=0}^{L2-1} I(t-k) \cdot a(L2-k-1) \quad (9)$$

$$RQ2(t) = \sum_{k=0}^{L2-1} Q(t-k) \cdot a(L2-k-1) \quad (10)$$

If at the time T0 the final chip of the spread unique word, i.e. I(T0)=Q(T0)=uw2(L2−1), is entered hereupon into the shift register circuit 30, the output RI2(T0) of the adding circuit 34 will be as follows, as derived from Equations (8) and (9).

$$RI2(T0) = \sum_{k=0}^{L2-1} I(T0-k) \cdot a(L2-k-1) \quad (11)$$

$$= \sum_{k=0}^{L2-1} uw2(L2-1-k) \cdot uw2(L2-k-1)$$

$$= \sum_{k=0}^{L2-1} \{uw2(L2-1-k)\}^2$$

Similarly, if at the time T0 the final chip of the spread unique word is entered hereupon into the shift register circuit 31, the output RQ2(T0) of the adding circuit 35 will be as follows, as derived from Equations (8) and (11).

$$RQ2(T0) = \sum_{k=0}^{L2-1} \{uw2(L2-1-k)\}^2 \quad (12)$$

As stated above, as the spread unique word uw2(n) is ±1, each term of Equations (11) and (12) will be "1", and RI2(T0) and RQ2(T0) will be represented by the following equation.

$$RI2(T0), RQ2(T0) = L2 \quad (13)$$

Thus, when the final chip of the unique word is entered into the shift register circuits 30 and 31, the values supplied from the adding circuits 34 and 35 will both be the largest correlated value L2 and, since the unique word is multiplexed over the leading edge of each frame, this value will be detected once in every frame.

According to the prior art, code spreading is accomplished by subjecting each bit of pre-spreading data d(m) to chip multiplication by the spreading code p(n) on the transmitting side, and on the receiving side correlation detection is carried out by using the spreading code p(n) In this case, if the code timings of transmission and reception are identical at the time T0, i.e. I(T0)=d(T0)×p(L−1), correlation detection is carried out in the following manner:

$$RI2(T0) = \sum_{k=0}^{L-1} I(T0-k) \cdot p(L-1-k) \quad (14)$$

$$= \sum_{k=0}^{L-1} d(T0-k') \cdot p(L-1-k) \cdot p(L-1-k)$$

where k'=int(k/L).

Since k=0, 1, 2, ..., L−1 in Equation (11), k' is always zero, and Equation (14) can be rewritten as follows.

$$RI2(T0) = \sum_{k=0}^{L-1} d(T0) \cdot \{p(L-1-k)\}^2 \quad (15)$$

Since d(T0)=±1, Equation (15) is ±L, whose largest correlated value can be obtained at every bit.

However, if the bandwidth expansion factor BW and the code length L are independently set, and BW is made smaller than L to reduce the bandwidth expansion factor BW, Equation (14) will be rewritten as follows:

$$RI2(T0) = \sum_{k=0}^{L-1} d(T0-k'') \cdot p(L-1-k) \cdot p(L-1-k) \quad (16)$$

where k"=int(k/BW).

Since this k" is not zero unlike in Equation (16), each term of Equation (16) will be either "1" or "−1" depending on the pre-spreading data, and the largest correlated value may not be obtained even if chip synchronization is achieved.

A method to integrate the absolute values of the terms of Equation (16) is also conceivable, but in this case random components including noise would also be added, resulting in a reduced S/N at the time of correlation detection.

Or if, as in Equation (17), the section in which a correlated value is detected is made equal to 1 information bit, i.e. k=0, 1, 2, ..., BW−1, though the largest correlated value can be obtained as is the case with Equation (16), but the S/N ratio at the time of correlation detection will drop where the integrating section is short, with the consequence that a high enough S/N ratio for correlation detection may not be secured where the bandwidth expansion factor BW is smaller than a certain level:

$$RI2(T0) = \sum_{k=0}^{BW-1} d(T0 - k'') \cdot p(L - 1 - k) \cdot p(L - 1 - k) \quad (17)$$

where k"=1nt(k/BW).

By contrast, the present invention according to which code spreading is accomplished with a code sequence wherein the unique word is frame-synchronized on the transmitting side, and on the receiving side correlation detection is carried out with multiplying elements of the same sequence as the spread unique words, the aforementioned problems can be solved, making it possible to obtain the largest correlated value at every frame.

The addition results (correlated values) RI2 and RQ2 from the adding circuits 34 and 35 are entered into the square adding circuit 36 chip by chip, and the square adding circuit 36 adds them after squaring them to calculate a square correlated value P0(t), which is supplied to the judging circuit 37.

Therefore, when RI2(TQ) and RQ2(T0) take on their respective largest values, P0(T0) is also at its largest.

Figure 6:
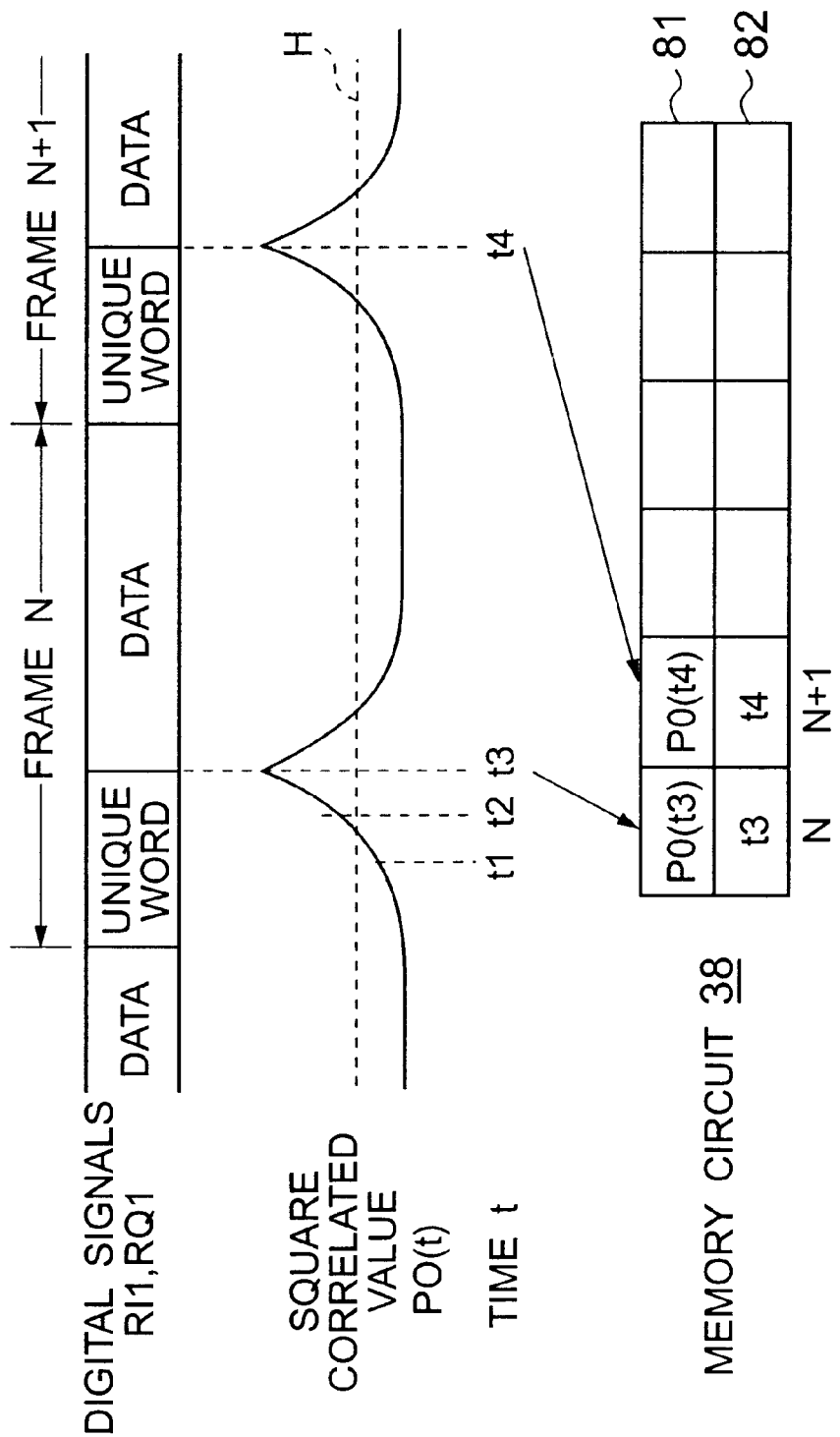
FIG. 6 is a diagram for describing the actions of a judging circuit and a memory circuit within the spread spectrum communication apparatus of FIG. 1.

The judging circuit 37 judges the detection of spread unique words by processing the square correlated value P0(t) in the following manner. FIG. 6 is a diagram for describing the actions of the judging circuit 37 and the memory circuit 38.

The memory circuit 38, besides storing a prescribed reference value H for removing noise from the square correlated values P0(t), has memory areas 81 and 82 for storing the times (t) corresponding to them, each for a plurality of values. One of these memory areas 81 and 82 is used for each frame of the receive digital signals RI1 and RQ1.

The judging circuit 37, when it receives one square correlated value P0(t), reads the reference value H out of the memory circuit 3, and judges whether or not the square correlated value P0(t) surpasses this reference value H.

Then the judging circuit 37, if it finds the square correlated value P0(t) not surpassing the reference value H, discards the square correlated value P0(t).

Or if the judging circuit 37 finds the square correlated value P0(t) surpassing the reference value H, it compares the largest square correlated value P0(T) currently stored in the memory area 81 for the current frame and the square correlated value P0(t).

The judging circuit 37, if it finds the square correlated value P0(t) greater, updates the largest square correlated value P0(T) currently stored in the memory area 81 for the current frame to P0(t), and also updates the time T stored in the memory area 82 for the current frame to t.

The judging circuit 37, by repeating the actions described above, seeks for the largest square correlated value P0(T) for each frame of the receive digital signals RI1 and RQ1.

For instance, in the frame N of FIG. 6, the square correlated value P0(t1) at the time t1 is discarded because it does not surpass the reference value H.

When the time t2 is reached, the square correlated value P0(t2) then, as it surpasses the reference value, is stored into the memory area 81 for the current frame as the largest square correlated value P0(T), and the time t2 is stored into the memory area 82 corresponding to the memory area 81.

Further, when the time t3 is reached, the square correlated value P0(t3) then, as it surpasses the reference value H and is greater than the largest square correlated value P0(T) stored in the memory area 81 for the current frame, is stored into the memory area 81 as the largest square correlated value P0(T), and the time t3 is stored into the memory area 82 corresponding to the memory area 81.

Thus, the square correlated value P0(t3) is stored into the memory area 81 for the current frame as the ultimately largest square correlated value P0(T), and the time t3 is stored into the memory area 82 corresponding to the memory area 81.

As described above, since such actions are performed for each frame, the square correlated value P0(t4) is stored at the next frame N+1 into the memory area 81 for the frame N+1 as the ultimately largest square correlated value P0(T), and the time t4 is stored into the memory area 82 corresponding to the memory area 81. The same applies to the frames after N+1.

Incidentally, the number of symbols (the number of data) per frame is known, and a square correlated value P0(t) is generated for each symbol of the receive digital signal RI1 and RQ1. Therefore, the judging circuit 37, when square correlated values P0(t) equivalent to a prescribed number of symbols have been entered, judges that one frame has been completed, and begins storing into the memory areas 81 and 82 for the next frame.

Next, the judging circuit 37, referring to a plurality of times at which storing into the memory area 82 took place, figures out the time intervals of the generation of the largest square correlated values, judges that, when the generation intervals of the largest square correlated values coincide with the frame length and such coincidence has occurred for a plurality of times consecutively, a spread unique word has been received at this timing, generates a timing signal RF1 meaning that, and gives it to the despreading code generating circuit 20.

The timing of this action is illustrated in FIG. 5. In FIG. 5, the timing signal RF1 is generated when the largest square correlated value has been obtained at equal intervals to the frame length three consecutive times, and the code sequence of the despread codes RP1 is reset, so that the initial code of the despreading codes RP1 be supplied from the trailing edge of the timing signal RF1.

To add, in the despreading codes RP1 shown in FIG. 5, "0" indicates the leading code, "1" the second code, "2" the third code, while "ANY" indicates that it may be any code.

The despreading code generating circuit 20 generates, in synchronism with the chip rate clock from the receive chip clock generating circuit 22, the same despreading codes RP1 as the spreading codes used in the counterpart station, and gives these despreading codes RP1 to the despreading circuit 18. Also, the despreading code generating circuit 20, when reset by the timing signal RF1 as mentioned above, begins supplying the despreading codes RP1 from the leading code onward immediately after the trailing edge of the timing signal RF1, i.e. at the leading edge of the data portion, as illustrated in FIG. 5.

The despreading circuit 18 despreads Ich and Qch digital signals RI1 and RQ1 supplied from the A/D converting circuit 13 with the despreading codes RP1 from the despreading code generating circuit 2, restores the pre-spreading Ich and Qch data at the bit rate, and gives the restored data to the demodulating circuit 12.

Therefore, on the transmitting side of the counterpart station, code spreading is synchronized with the transmitting side timing signal and the leading code of the spreading codes is multiplied from the data portion immediately after the unique word, so that despreading can be accomplished at the same time as spreading if the timing of the unique word is correctly detected on the receiving side of the own station.

The demodulating circuit 12, after demodulating the despread data from the despreading circuit 18 by a predetermined system, transmits them to the frame synchronization circuit 11.

The frame synchronization circuit 11 detects again the unique words out of the demodulated data supplied from the demodulating circuit 12, and protects them. At the same time, it extracts only the data portions cleared of the unique word, and subjects them to serial/parallel conversion for transmission to the decoding circuit 10.

The decoding circuit 10, after decoding signals received from the frame synchronization circuit 11 by a predetermined system, transfers them to the user side.

Embodiment 2

Next will be described another embodiment of the present invention with reference to a drawing. In this embodiment, although the overall configuration of the spread spectrum communication apparatus is the same as that of FIG. 1, the configuration and operation of the correlation detecting circuit 19 differ. Further in this embodiment, it is presupposed that the unique words of Ich and Qch differ.

Figure 7:
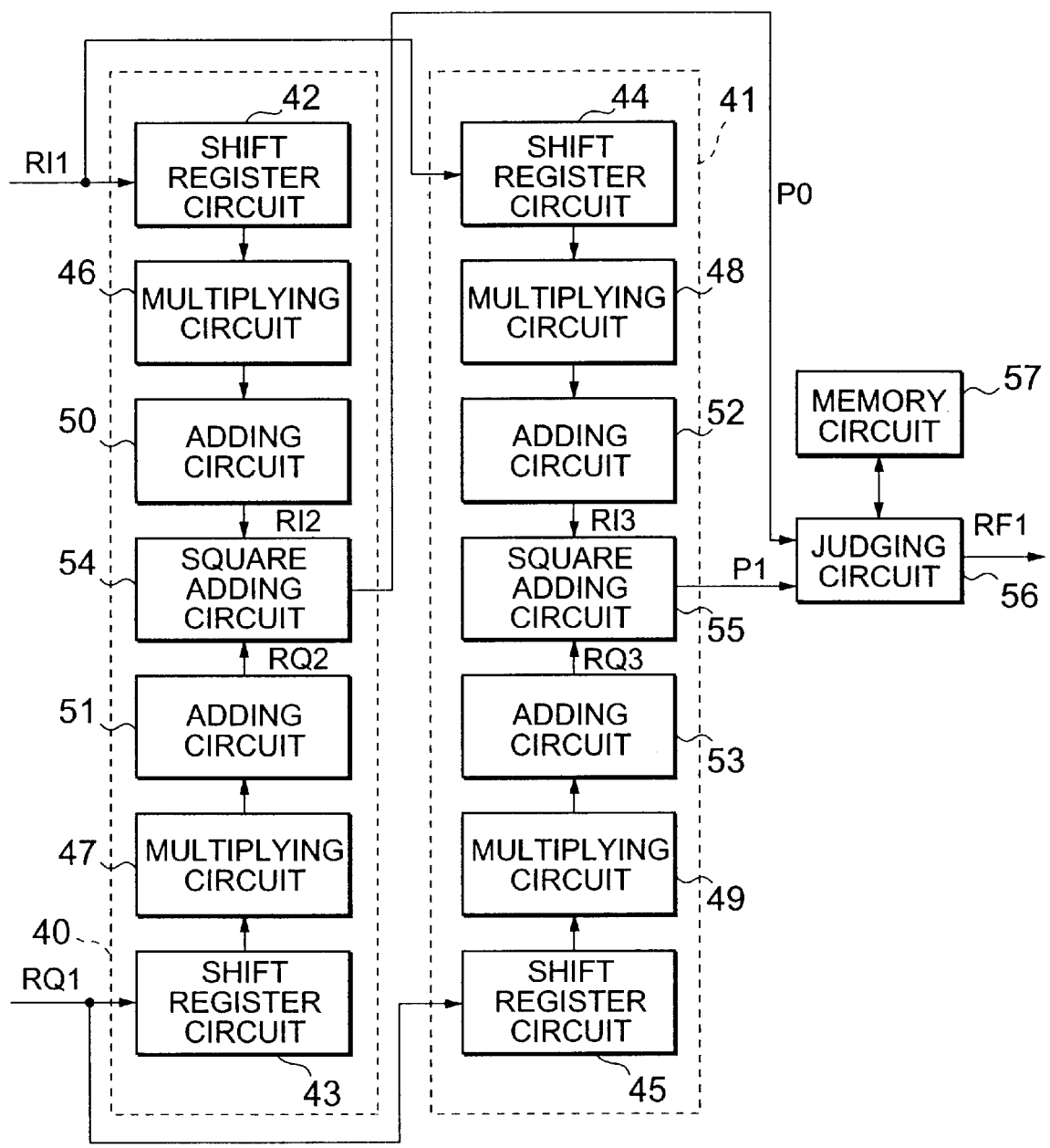
FIG. 7 is a block diagram of the internal configuration of the correlation detecting circuit in a second preferred embodiment of the invention.

FIG. 7 is a block diagram of the internal configuration of the correlation detecting circuit in this embodiment of the invention. It differs from the circuit of FIG. 2 in that it has two sets, i.e. detecting circuits 40 and 41, of circuits each corresponding to the group circuits comprising the shift register circuits 30 and 31, multiplying circuits 32 and 33, adding circuits 34 and 35 and square adding circuit 36, that the values of multiplying elements in multiplying circuits 46 through 49 differ from one multiplying circuit to another, and that a judging circuit 56 uses a different judging method.

As the configurations and actions of shift register circuits 42 through 45 and a memory circuit 57 are respectively the same as those of the shift register circuits 30 and 31 and the memory circuit 38 in FIG. 2, their description is dispensed with here.

Further, unique word multiplexing and code spreading on the transmitting side are also the same as in Embodiment 1 except for the difference in Ich and Qch unique words.

Receive digital signals RI1 of the baseband frequency range supplied from the A/D converting circuit 13 of FIG. 1 are entered into the shift register circuits 42 and 44 in FIG. 7, and receive digital signals RQ1 are similarly entered into the shift register circuits 43 and 45.

The output of the shift register circuit 42 for each chip is multiplied by the corresponding multiplying element in the multiplying circuit 46, and the product is supplied to the adding circuit 50; the output of the shift register circuit 43 at each chip is multiplied by the corresponding multiplying element in the multiplying circuit 47, and the product is supplied to the adding circuit 51; the output of the shift register circuit 44 at each chip is multiplied by the corresponding multiplying element in the multiplying circuit 48, and the product is supplied to the adding circuit 52; and the output of the shift register circuit 45 at each chip is multiplied by the corresponding multiplying element in the multiplying circuit 49, and the product is supplied to the adding circuit 53.

All the outputs of the multiplying circuit 46 are added by the adding circuit 50, whose addition result RI2 is supplied to the square adding circuit 54; all the outputs of the multiplying circuit 47 are added by the adding circuit 51, whose addition result RQ2 is supplied to the square adding circuit 54; all the outputs of the multiplying circuit 48 are added by the adding circuit 52, whose addition result RI3 is supplied to the square adding circuit 55; and all the outputs of the multiplying circuit 49 are added by the adding circuit 53, whose addition result RQ3 is supplied to the square adding circuit 55.

The square adding circuit 54 adds the addition results RI2 and RQ2 after squaring each, and supplies a square correlated value P0, which is the result of this square addition to the judging circuit 56.

Further the square adding circuit 55 adds the addition results RI3 and RQ3 after squaring each, and supplies a square correlated value P1, which is the result of this square addition to the judging circuit 56.

Since the unique words of Ich and Qch differ in this embodiment, the unique word of L1 [bits] on each channel being represented by uwi1(m) and uwq1(m) (m=0, 1, 2, . . . L1−1) and the spreading code of L [chips] in code length on the transmitting side by p(t) (t=0, 1, 2, . . . ), the spread unique words uwi2(n) and uwq2(n) of L2 [chips] on each channel will be as follows (n=0, 1, 2, . . . , L2−1):

$$uwi2(n)=uwi1(m) \times p(t)=uwi1(m) \times p(k) \tag{18}$$

$$uwq2(n)=uwq1(m) \times p(t)=uwq1(m) \times p(k) \tag{19}$$

where k=mod(t, L), and the range of values k can take is 0, 1, 2, . . . , L−1, while m=int(n/BW), and the value uwi1(m), uwq1(m), uwi2(n), uwq2 (n) and p(k) can take is either +1 or −1.

The present invention uses four-phase phase modulation as the modulation system, and accordingly four kinds of phase ambiguity arise on the receiving side.

There was no problem with Embodiment 1 where the unique words of Ich and Qch were of the same pattern, but in this embodiment, wherein the unique words of Ich and Qch do not share the same pattern, and the pattern of spread unique words contained in RI1 and RQ1 varies, the multiplying elements in the multiplying circuit 46 through 49 need to be matched to the different patterns.

If, for instance, the receive phase deviates from that on the transmitting side by π/2, the spread unique words contained in the receive digital signals RI1 and RQ1 are not uwi2 (n) and uwq2 (n), but are uwq2 (n) and bar uwi2 (n).

Accordingly, in FIG. 7, the multiplying element in the multiplying circuit 46 being represented by a(n), the multiplying element in the multiplying circuit 47 by b(n), the multiplying element in the multiplying circuit 48 by c(n), and the multiplying element in the multiplying circuit 49 by d(n), they take different values as follows.

$$a(n)=uwi1(m) \cdot p(n) \; uwi1(m) \cdot p(k)=uwi2(n) \tag{20}$$

$$b(n)=uwq1(m) \cdot p(n) \; uwq1(m) \cdot p(k)=uwq2(n) \tag{21}$$

$$c(n)=uwq1(m) \cdot p(n) \; uwq1(m) \cdot p(k)=uwq2(n) \tag{22}$$

$$d(n) = \overline{uwi1(m) \cdot p(n)} = \overline{uwi1(m) \cdot p(k)} = \overline{uwi2(n)} \tag{23}$$

In Equations (20) through (23), k=mod(n, L), and the range of values k can take is 0, 1, 2, . . . , L−1, while m=int(n/BW), and the range of values n can take is 0, 1, 2, . . . , L2−1. To add, the bar over a code or an equation means inversion, i.e. inversion of "+1" is "−1", while inversion of "−1" is "+1".

If the receive phase is the same as that on the transmitting side and the final chips of spread unique words are entered into the shift register 42 and 43 at the time T0, the operations of the adding circuits 50 and 51 and the square adding circuit 54 will be as follows.

$$RI2(T0) = \sum_{k=0}^{L2-1} I(t-k) \cdot a(L2-k-1) \qquad (24)$$

$$= \sum_{k=0}^{L2-1} I(T0-k) \cdot a(L2-k-1)$$

$$= \sum_{k=0}^{L2-1} uwi2(L2-1-k) \cdot uwi2(L2-k-1)$$

$$= \sum_{k=0}^{L2-1} \{uwi2(L2-1-k)\}^2 = L2$$

$$RQ2(T0) = \sum_{k=0}^{L2-1} Q(t-k) \cdot b(L2-k-1) \qquad (25)$$

$$= \sum_{k=0}^{L2-1} Q(T0-k) \cdot b(L2-k-1)$$

$$= \sum_{k=0}^{L2-1} uwq2(L2-1-k) \cdot uwq2(L2-k-1)$$

$$= \sum_{k=0}^{L2-1} \{uwq2(L2-1-k)\}^2 = L2$$

Where the receive phase deviates from that on the transmitting side by $\pi/2$, and the final chips of spread unique words are entered into the shift register 44 and 45 at the time T0, the operations of the adding circuits 52 and 53 and the square adding circuit 55 will be as follows.

$$RI2(T0) = \sum_{k=0}^{L2-1} Q(t-k) \cdot c(L2-k-1) \qquad (26)$$

$$= \sum_{k=0}^{L2-1} Q(T0-k) \cdot c(L2-k-1)$$

$$= \sum_{k=0}^{L2-1} uwq2(L2-1-k) \cdot uwq2(L2-k-1)$$

$$= \sum_{k=0}^{L2-1} \{uwq2(L2-1-k)\}^2 = L2$$

$$RQ2(T0) = \sum_{k=0}^{L2-1} \overline{I(t-k)} \cdot d(L2-k-1) \qquad (27)$$

$$= \sum_{k=0}^{L2-1} \overline{I(T0-k)} \cdot d(L2-k-1)$$

$$= \sum_{k=0}^{L2-1} \overline{uwi2(L2-1-k)} \cdot \overline{uwi2(L2-1-k)}$$

$$= \sum_{k=0}^{L2-1} \{\overline{uwi2(L2-1-k)}\}^2 = L2$$

Therefore, the outputs P0(T0) and P1(T0) of the square adding circuits 54 and 55 at the time T0 will take the same values as shown below whether the receive side is in phase with the transmitting side or there is a deviation by $\pi/2$.

$$P0(T0) = \{RI2(T0)\}^2 + \{RQ2(T0)\}^2 = 2L2^2 \qquad (28)$$

$$P1(T0) = \{RI2(T0)\}^2 + \{RQ2(T0)\}^2 = 2L2^2 \qquad (29)$$

Where the receive phase is off that on the transmitting side by $\pi$, as the results of addition by the adding circuits 50 and 51 in Equations (24) and Equation (25) are $-L2$, P0(T0) in Equation (28) is also $2L2^2$.

Or where the receive phase is off that on the transmitting side by $3\pi/2$, as the results of addition by the adding circuit 52 in Equations (26) and (27) are $-L2$, P1(T0) in Equation (29) is similarly $2L2^2$.

Therefore, where the receive side is either in phase with the transmitting side or deviates by $\pi$, the output square P0(T0) of the adding circuit 54 shows the largest correlated value, and where the receive phase is off by $\pi/2$ or $3\pi/2$, the output P1(50) of the square adding circuit 55 shows the largest correlated value.

The judging circuit 56 judges spread unique word detection in the following manner according to the square correlated values P0(t) and P1(t).

First, the configuration of the memory circuit 57 is the same as that of the memory circuit 38 of FIG. 2.

The judging circuit 56, upon receiving one each of the square correlated value P0(t) and P1(t), compares their relative magnitudes, and chooses the larger one as the square correlated value P0(t') while discarding the smaller.

Then, the judging circuit 56 reads the reference value H out of the memory circuit 57, and judges whether or not the square correlated value P0(t') surpasses this reference value H.

The judging circuit 56, if the square correlated value P0(t') does not surpass the reference value H, will discard the square correlated value P0(t').

Or the judging circuit 56, if it finds the square correlated value P0(t') surpassing the reference value H, will compare the square correlated value P0(t') with the largest square correlated value P0(T) stored in the memory area 81 for the current frame in the memory circuit 57.

Then the judging circuit 56, if it finds the square correlated value P0(t') larger, will update the largest square correlated value P0(T) stored in the memory area 81 for the current frame to P0(t'), and also update the time T stored in the memory area 82 for the current frame to the current time t'.

The judging circuit 56 repeats the above-described actions, and thereby figures out the largest square correlated value P0(T) for each frame of the receive digital signals RI1 and RQ1.

Next, the judging circuit 56, referring to a plurality of times stored in the memory area 82, figures out the time intervals of the generation of the largest square correlated values, judges that, when the generation intervals of the largest square correlated values coincide with the frame length and such coincidence has occurred for a plurality of times consecutively, a spread unique word has been received at this timing, generates a timing signal RF1 meaning that, and gives it to the despreading code generating circuit 20 in FIG. 1.

The timing of the timing signal RF1 and that of the despreading code RP1 at this time are respectively the same as in Embodiment 1. Thus the operation of the judging circuit 56 is the same as that of the judging circuit 37 except that square correlated values P0(t) and P1(t) are compared in magnitude at first.

As hitherto described, this embodiment can, even if the unique words of Ich and Qch are different, carry out spread unique word detection and receive data despreading equally to Embodiment 1.

Embodiment 3

Figure 8:
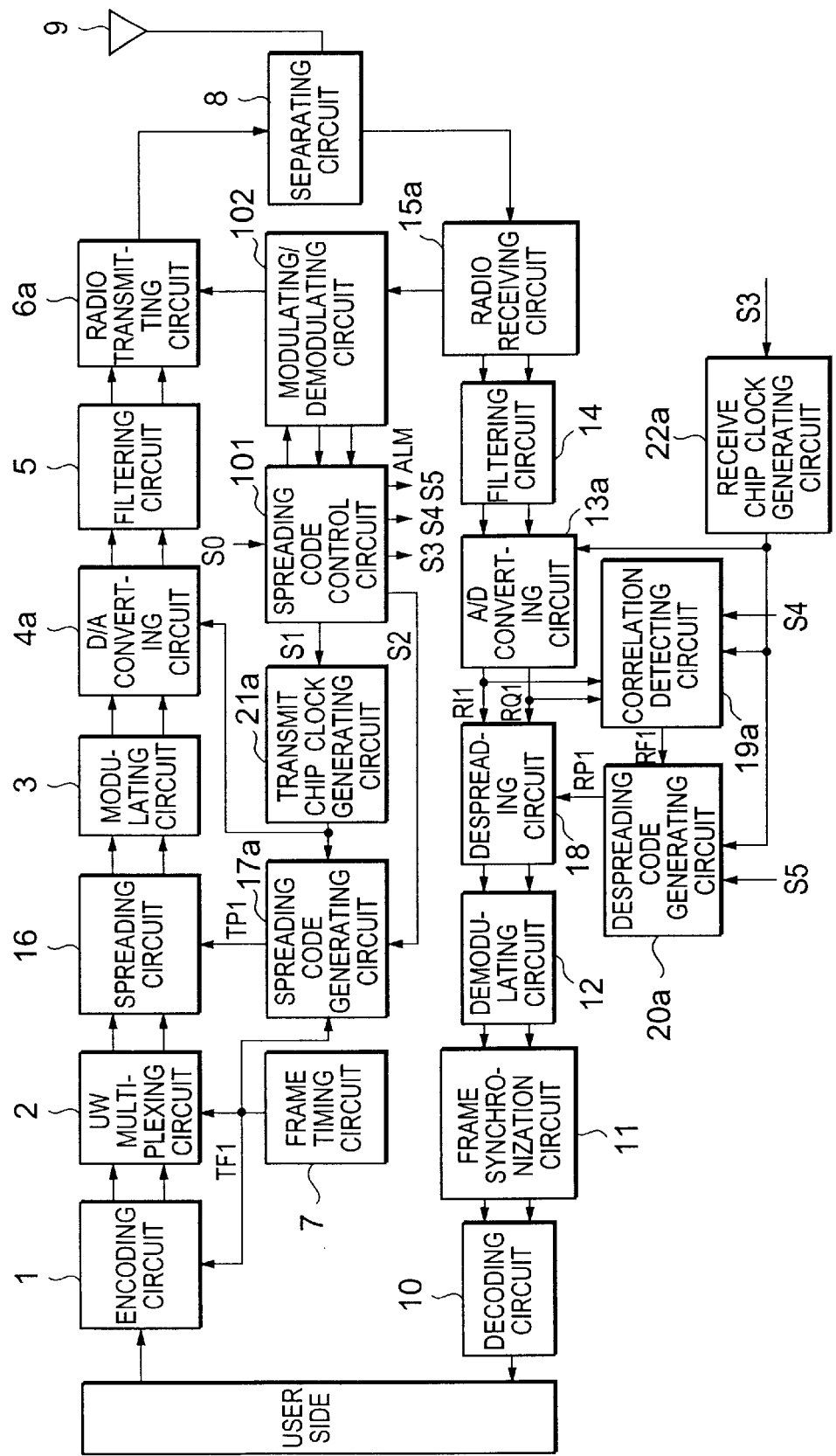
FIG. 8 is a block diagram of a spread spectrum communication apparatus, which is a third preferred embodiment of the present invention.
Figure 9:
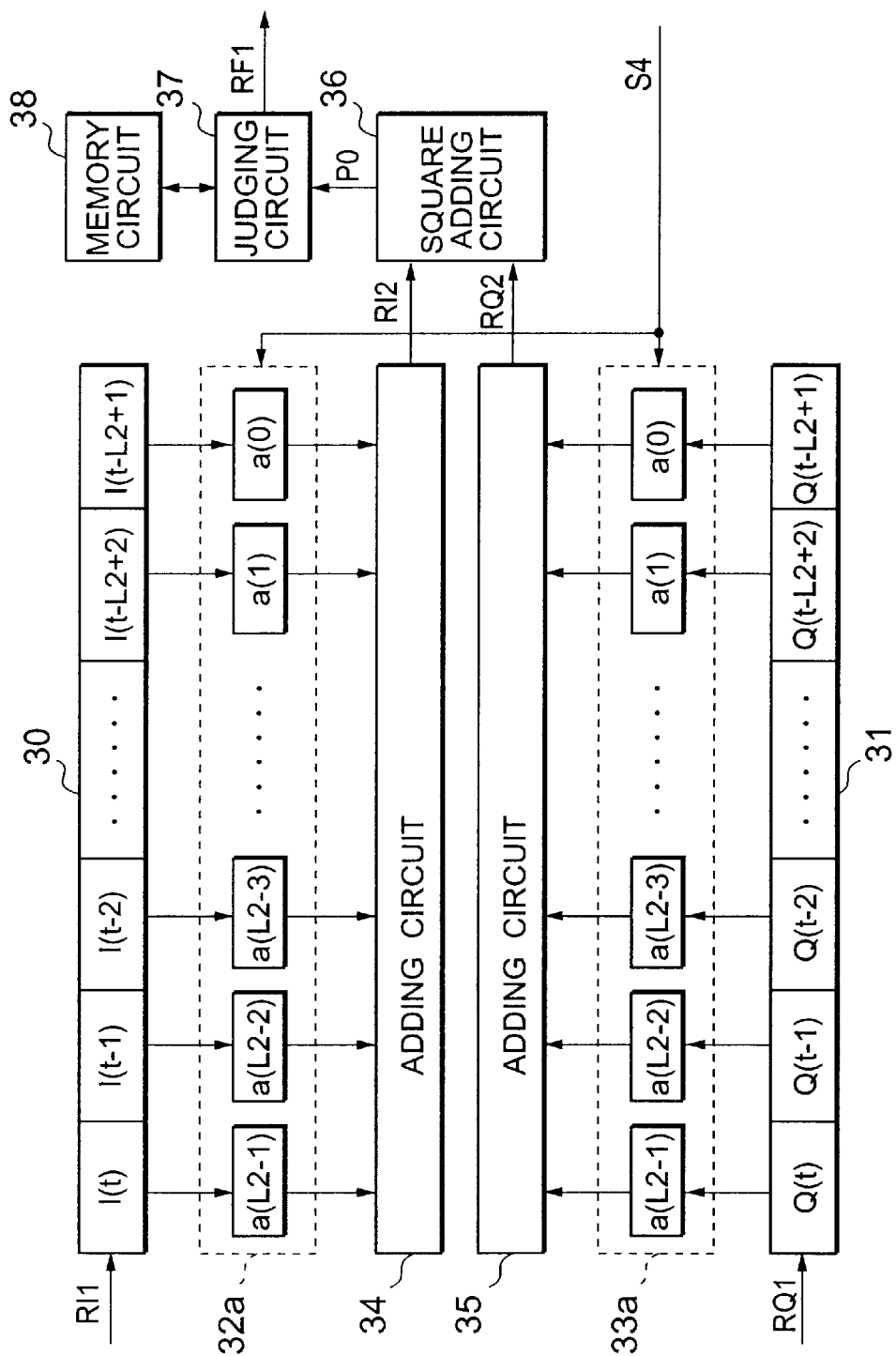
FIG. 9 is a block diagram illustrating the internal configuration of the correlation detecting circuit of the spread spectrum communication apparatus of FIG. 8.

FIG. 8 is a block diagram of a spread spectrum communication apparatus, which is a third preferred embodiment of the present invention, and FIG. 9 is a block diagram illustrating the internal configuration of the correlation detecting circuit of the spread spectrum communication apparatus of FIG. 8. The same constituent elements as in FIGS. 1 and 2 are assigned respectively the same signs.

A transmit chip clock generating circuit 21a generates a clock of a chip rate fc as does the transmit chip clock generating circuit 21 of FIG. 1, and the chip rate fc here can be set as desired with a control signal S1.

A spreading code generating circuit 17a generates spreading codes TP1 as does the spreading code generating circuit 17 of FIG. 1, and the initial value and period of the spreading codes TP1 here can be set as desired with a control signal S2.

A receive chip clock generating circuit 22a generates a clock of a chip rate fc as does the transmit chip clock generating circuit 21 of FIG. 1, and the chip rate fc here can be set as desired with a control signal S1.

Multiplying circuits 32a and 33a in a correlation detecting circuit 19a consist of respectively as many multiplying elements (n) as the registers of shift register circuits 30 and 31 as do the multiplying circuit 32 and 33 in FIG. 2, and the characteristics of the multiplying elements (n) can be set as desired with a control signal S4. To add, while the number of multiplying elements needed for correlation detection out of all the multiplying elements (n) varies with the length of the spreading code TP1, the number can be adjusted according to the length of the spreading code TP1 by setting a value appropriate only for the required number of multiplying elements and zero for all other purposes.

A despreading code generating circuit 20a generates despreading codes RP1 as does the despreading code generating circuit 20 of FIG. 1, and the initial value and period of the despreading codes RP1 here can be set as desired with a control signal S5.

Next will be described the spread spectrum communication apparatus of this embodiment.

On the transmitting side, a spreading code control circuit 101, on the basis of required system parameters such as the required S/N ratio, permissible radio channel spacing, transmit power, and adjoining channel interference first entered from an external input S0 in advance, calculates the optimal bandwidth expansion factor BW where the efficiency of frequency use is optimized, the efficiency being expanded to the largest frequency range satisfying these system conditions.

And the chip rate fc is calculated from these optimal bandwidth expansion factor BW and bit rate fb.

Incidentally, it is obviously acceptable to enter the optimal bandwidth expansion factor BW with an external input S0 entered in advance instead of controlling it with the spreading code control circuit 101 itself.

Then, the spreading code control circuit 101 supplies to the transmit chip clock generating circuit 21 the control signal S1 indicating the calculated chip rate fc.

Further, the spreading code control circuit 101, regarding the code length (period) L of the spreading code, determines an initial value and period which would give a standard code length, and supplies a control signal S2 indicating the determined initial value and period to the spreading code generating circuit 17.

Further, the data of these control signals S1 and S2 are entered into and modulated by a modulating/demodulating circuit 102 which performs some other way of modulation than spread-modulation, such as FM, BPSK or QPSK modulation/demodulation, and the modulated wave is entered into a radio transmitting circuit 6a.

The radio transmitting circuit 6a transmits the modulated wave supplied from the modulating/demodulating circuit 102 together with the spread-modulated wave having passed the filtering circuit 5.

Figure 10:
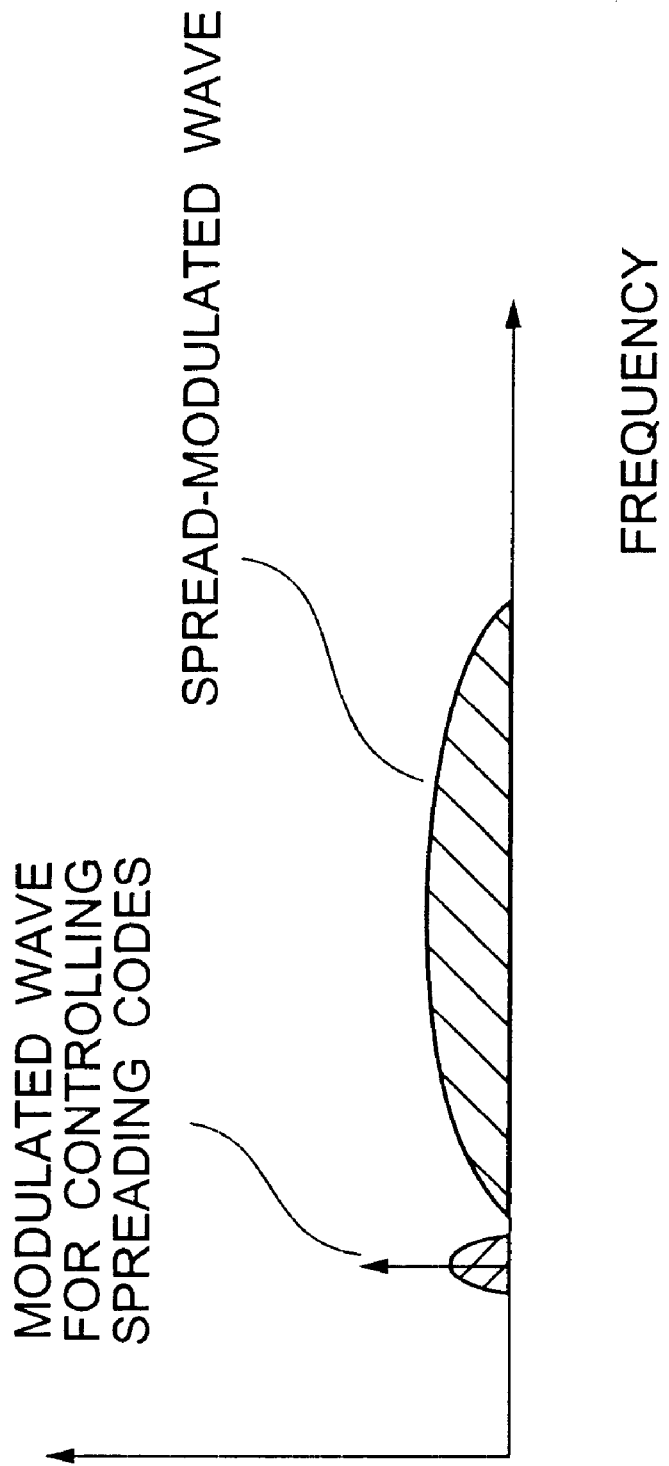
FIG. 10 is a diagram illustrating the spectrum of a transmit signal.

Incidentally, as is evident from the spectrum of transmit signals of FIG. 10, the modulated wave for controlling spreading codes (the modulated wave supplied from the modulating/demodulating circuit 102) needs no broad bandwidth or a high carrier level because of its small information quantity, a carrier can be provided immediately beside the main spread-modulated wave, and accordingly no increase in frequency range is entailed.

On the other hand, at the counterpart station having a similar apparatus to that illustrated in FIG. 8, the radio receiving circuit 15a separates the main spread-modulated wave and the modulated wave for controlling spreading codes from each other, and supplies the modulated wave for controlling the spreading codes to the modulating/demodulating circuit 102.

The modulating/demodulating circuit 102 demodulates the modulated wave for controlling spreading codes, transmitted from the transmitting side, supplies the control signals S1 and S2 to the spreading code control circuit 101 and, at the same time, supplies control signals S3, S4 and S5 so as to accomplish despreading.

Incidentally, the modulating/demodulating circuit 102 detects the S/N ratio or bit error rate (BER) of the receive signals and, if the detected S/N ratio or BER deteriorates beyond a prescribed level, supplies an ALM signal to the spreading code control circuit 101.

The spreading code control circuit 101, when this ALM signal is entered, supplies to the despreading code generating circuit 20 the control signal S5 to determine the code length (period) L of the despreading codes so as to make the code length (period) L greater than the preset standard value.

At the same time, by providing the control signal S5 from the spreading codes control circuit 101 to the modulating/demodulating circuit 102, the control signal S5 is transmitted as the modulated wave for controlling the spreading codes.

The radio receiving circuit 15a on the transmitting side separates the main spread-modulated wave and the modulated wave for controlling spreading codes from each other, and supplies the modulated wave for controlling the spreading codes to the modulating/demodulating circuit 102.

The modulating/demodulating circuit 102 demodulates the modulated wave for controlling the spreading codes transmitted from the counterpart station, and supplies the control signal S5 to the spreading code control circuit 101.

The spreading code control circuit 101 controls the value of the control signal S2 so as to equalize the code length (period) L of the spreading codes TP1 to the code length L indicated by the control signal S5.

To add, as a D/A converter 4a and an A/D converter 13a perform sampling by an integral multiple of the chip rate fc, it is so intended that the sampling frequency be controlled in coordination with the control of the chip rate fc.

In the control system described above, it is possible to set the bandwidth expansion factor BW to an optimal value and the code length L to a standard level for use at normal times, and to extend the code length L when the quality of the reception line is degraded by fading or some other cause.

Correlative computation is usually extended in the time needed for detection with an increase in code length, but as this system normally uses a reduced code length, the time required for detecting can be saved and reception can be established at high speed.

Further, in case a mobile object runs into a shadowing phenomenon or the C/N ratio is deteriorated by rain attenuation, the reception quality is improved by extending the code length L and thereby enhancing the capability for correlation detection.

As a result, there is provided the advantage of enabling a communication system to be architected with enhanced quality and efficiency of frequency use.

Figure 13:
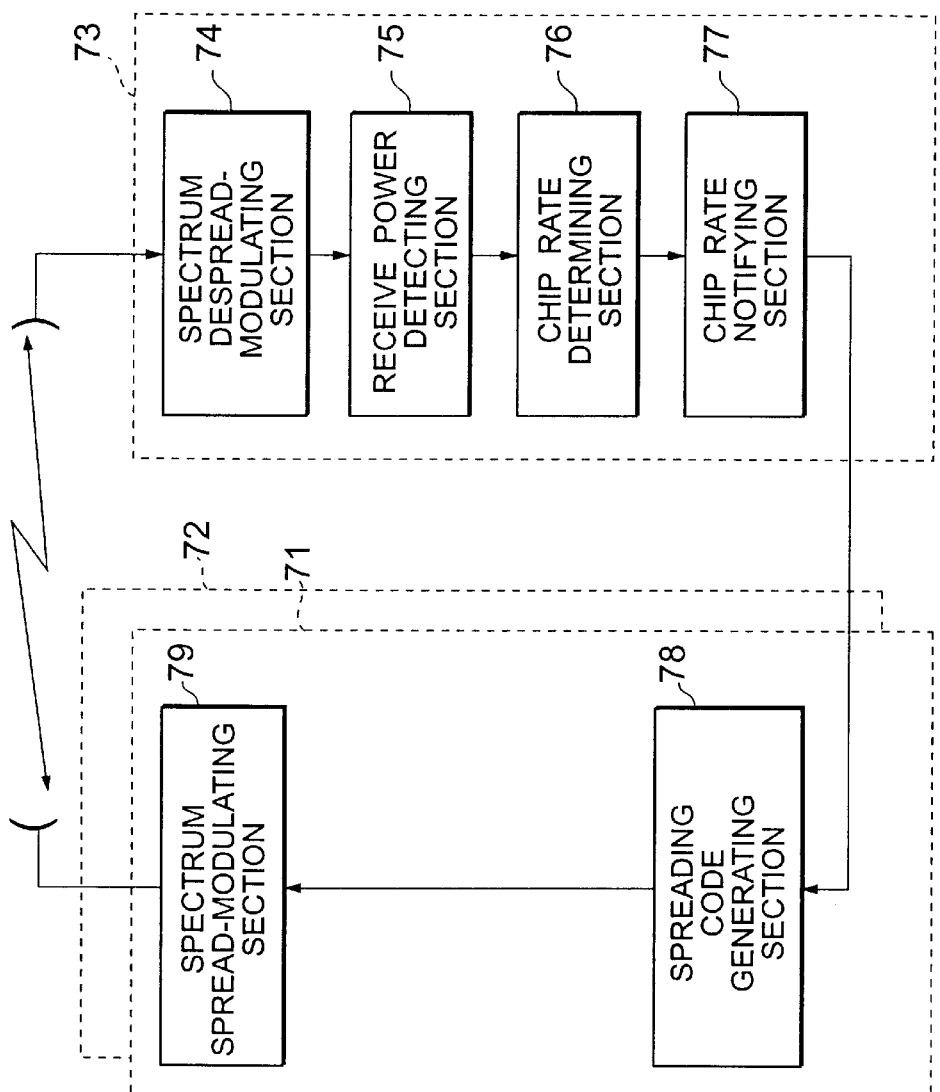
FIG. 13 is a block diagram illustrating the configuration of a CDMA communication system.

Incidentally, while this embodiment carries out radio transmission using signals resulting from the superposing of spread-modulation and some other modulation system for transmission and reception of control signals, it is of course acceptable to use for transmission another line as illustrated in FIG. 13, such as a ground telephone line or some other independent radio line.

Embodiment 4

Figure 11:
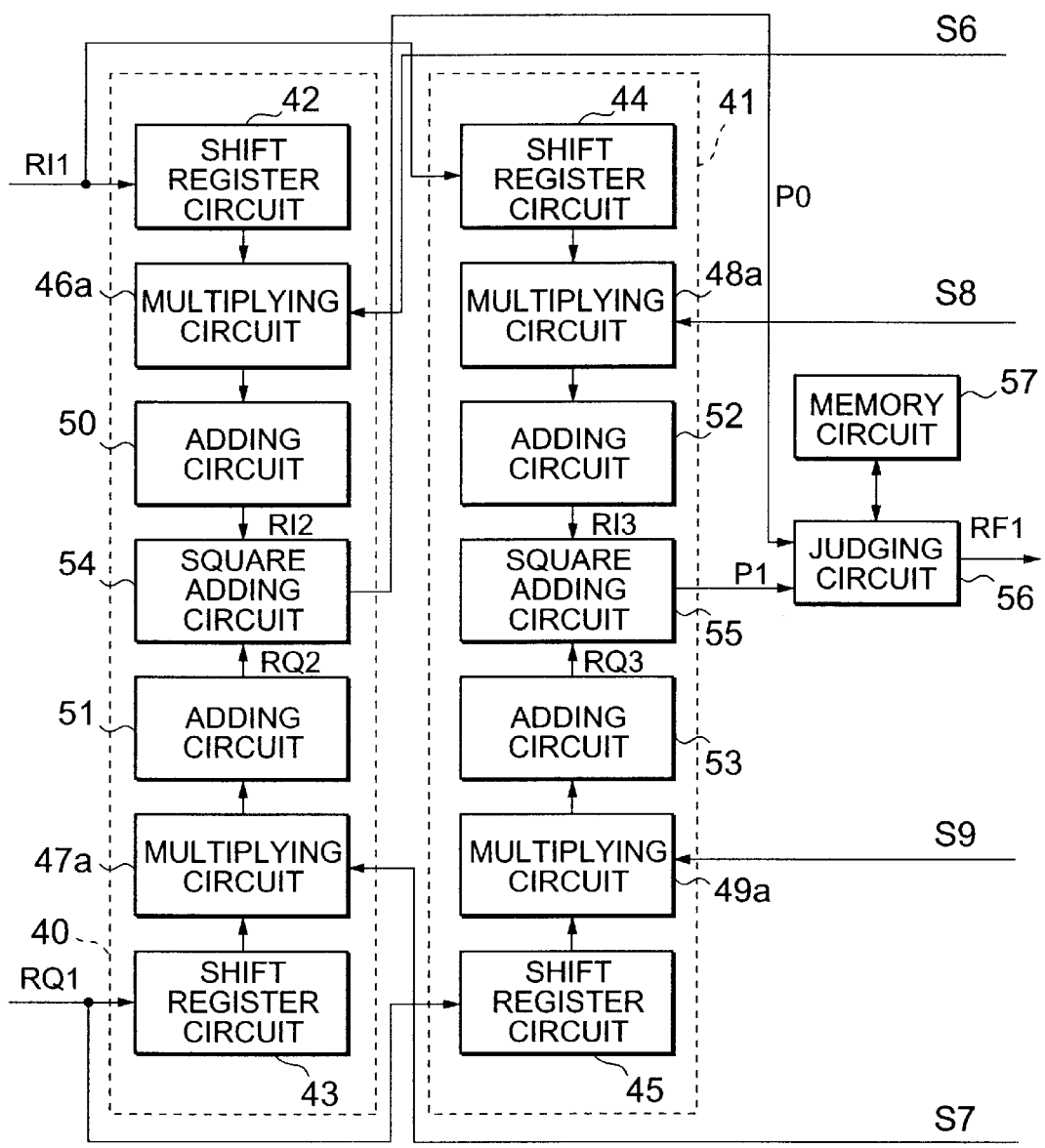
FIG. 11 is a block diagram of the internal configuration of the correlation detecting circuit in a fourth preferred embodiment of the invention.
Figure 12:
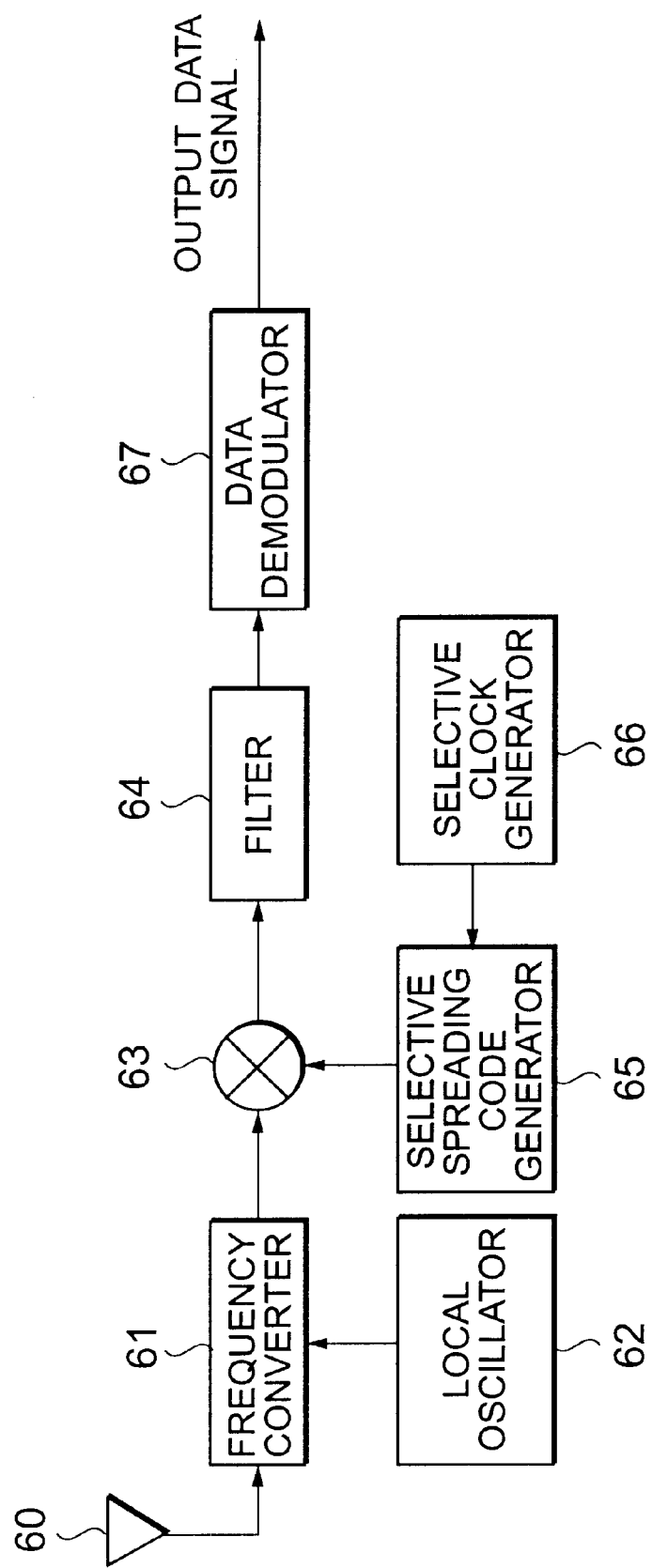
FIG. 12 is a block diagram illustrating the configuration of the receiving section of a spread spectrum communication apparatus according to the prior art.

FIG. 11 is a block diagram of the internal configuration of the correlation detecting circuit in a fourth preferred embodiment of the present invention. In this embodiment, again, although the overall configuration of the spread spectrum communication apparatus is the same as that illustrated in FIG. 8, the configuration and operation of its correlation detecting circuit 19a are different. Further, this embodiment presupposes the use of different Ich and Qch unique words.

The characteristics of multiplying elements of multiplying circuit 46a, 47a, 48a and 49a in the correlation detecting circuit 19a can be separately set with control signals S6, S7, S8 and S9, and the configuration is the same as that of Embodiment 2 in other respects.

In this way, even though the Ich and Qch unique words are different, the same benefit can be obtained as from Embodiment 3.

According to the present invention, a fixed pattern is multiplexed over the leading edge of each frame of transmit data; spread codes are generated at a timing synchronized with the frames; the transmit data multiplexed with the fixed pattern are spread-modulated with spreading codes and transmitted to the counterpart station; spread-modulated signals received from the counterpart station and the same code sequence as the fixed pattern are correlatively detected; despreading codes are generated at a timing synchronized with the frames when detection of the fixed pattern is judged by correlation detection; and spread-modulated signals are despread-modulated with despreading codes, thereby to make possible independent setting of the code length and the bandwidth expansion factor, so that the code length can be determined without worrying about the efficiency of frequency use or the limit to the operating speed of devices, and the bandwidth expansion factor can be set to achieve the optimal bandwidth for the efficiency of frequency use of the system. Furthermore, as described above, even if the spread spectrum signals differ in the code length and bandwidth expansion factor of spreading codes, correlation detection is made possible on the receiving side spanning a plurality of information bits by carrying out code spreading of a fixed pattern (unique word) in synchronism with frames, and even though correlation detection is accomplished in such a manner, a sufficiently high S/N ratio for detecting the code timing and the timing of the fixed pattern irrespective of the content of the information bit, such as "1" or "0", other than the fixed pattern can be obtained.

Further, by controlling the code length and bandwidth expansion factor of spreading codes and the code length and bandwidth expansion factor of despreading codes, it is made possible to set the bandwidth expansion factor to an optimal value and the code length to a standard level for use at normal times, and to extend the code length to enhance the performance of correlation detection when the quality of the reception line is degraded by fading or some other cause. As a result, a communication system can be architected with enhanced quality and efficiency of frequency use.

Furthermore, detection of a spread-modulated fixed pattern and despread-modulation of receive data can be achieved by multiplying spread-modulated signals received from the counterpart station and multiplication coefficients of the same code sequence as the fixed pattern on two mutually orthogonal channels for each bit, adding the multiplication products on the chip-by-chip basis, calculating the sum of squares from the results of addition, comparing the sum of squares with a prescribed value, and determining the largest square correlated value for each frame.

Also, detection of a spread-modulated fixed pattern and despread-modulation of receive data can be achieved by detecting coincidence between the intervals of the generation of the largest square correlated value and frame spacing and, if such coincidence is repeated a plurality of consecutive times, determining the reception of the fixed pattern.

Furthermore, by multiplying multiplication coefficients corresponding to two sequences of transmit/receive data and to two sequences of fixed pattern and receive data for each chip, and adding the multiplication products on the chip-by-chip basis in an equivalent of two sequences for each of I and Q channels, and adding the squared addition result for each of the I and Q channels to figure out two sequences of square correlated values, detection of a spread-modulated fixed pattern and despread-modulation of receive data can be achieved even if the fixed patterns of the I and Q channels differ from each other.

Also, detection of a spread-modulated fixed pattern and despread-modulation of receive data can be achieved by figuring out the largest square correlated value for each frame by using the larger of square correlated values in the two sequences, and judging that a spread-modulated fixed pattern has been received when coincidence between the interval of this largest square correlated value and the frame length has been repeated for a plurality of consecutive times.

Further, by diverting the unique word, conventionally used by demodulating circuits and frame synchronization circuits, as the fixed pattern for correlation detection, the aforementioned benefits can be achieved without sacrificing the frame efficiency.

What is claimed is:

1. A method of spread spectrum communication, said method comprising the steps of:

multiplexing a fixed pattern over the leading edge of each frame of transmit data;

generating a spreading code at a timing synchronized with each of said frames;

spread-modulating the transmit data multiplexed with said fixed pattern with said spreading codes and transmitting them to a counterpart station;

detecting correlations between spread-modulated signals received from said counterpart station and a code sequence same as said fixed pattern;

generating a dispreading code at a timing synchronized with said frame if said fixed pattern is detected by said correlation detection; and despread-modulating with said dispreading codes said spread-modulated signals.

2. The method of spared spectrum communication, as claimed in claim 1, wherein a code length and a bandwidth expansion factor for said spreading codes can be set independent of each other.

3. The method of spread spectrum communication, as claimed in claim 2, wherein a ratio between said code length and said bandwidth expansion factor is variable.

4. A method of spread spectrum communication, said method comprising the steps of:

multiplexing a fixed pattern over the leading edge of each frame of transmit data;

generating a spreading code at a timing synchronized with each of said frames;

controlling the code length and the bandwidth expansion factor of said spreading codes to prescribed values;

spread-modulating the transmit data multiplexed with said fixed pattern with said spreading codes; and transmitting control signals for said code length and bandwidth expansion factor to a counterpart station along with said spread modulation;

detecting correlations between spread-modulated signals received from said counterpart station and a code sequence same as said fixed pattern;

generating a dispreading code at a timing synchronization with said frame if said fixed pattern is detected by said correlation detection;

controlling the code length and the bandwidth expansion factor of said dispreading codes in accordance with said received control signals; and despread-modulating said spread-modulated signals with said dispreading codes.

5. The method of spread spectrum communication, as claimed in claim 4, wherein the control of said code length and bandwidth expansion factor is such that at first said bandwidth expansion factor is set to a prescribed optimal value and said code length to a short value, and said code length is extended on the basis of the reception characteristics of said counterpart station.

6. The method of spread spectrum communication, as claimed in claim 5, wherein said optimal value satisfies the required system parameters and optimizes the efficiency of frequency use.

7. The method of spread spectrum communication, as claimed in claim 4, wherein said reception characteristics mean that the SN ratio or BER of said control signals is not inferior to a prescribed value.

8. The method of spread spectrum communication, as claimed in claim 4, wherein said control signals are on a carrier of a prescribed frequency modulated by a prescribed system independent of said spread-modulation.

9. The method of spread spectrum communication, as claimed in claim 8, wherein the carrier of said prescribed frequency is arranged beside the transmit spectrum of said spread-modulation.

10. The method of spread spectrum communication, as claimed in claim 1, wherein said correlation detection comprising the steps of:

multiplying spread-modulated signals received from said counterpart station and multiplication coefficients of the same code sequence as said fixed pattern on two mutually orthogonal channels for each bit;

adding the multiplication products on the chip-by-chip basis;

calculating the sum of squares from said results of addition;

comparing said sum of squares with a prescribed value, and determining the largest square correlated value for each frame.

11. The method of spread spectrum communication, as claimed in claim 10, wherein said correlation detection further comprising the steps of:

detecting coincidence between the generation interval of said largest square correlated value and the frame interval; and judging that said fixed pattern has been received when said coincidence has been repeated for a plurality of consecutive times.

12. The method of spared spectrum communication, as claimed in claim 1, wherein said fixed pattern differs with each of said transmit data in the two sequences of the mutually orthogonal I channel and Q channel.

13. The method of spread spectrum communication, as claimed in claim 12, wherein said correlation detection includes multiplication of multiplication coefficients corresponding to two sequences of transmit/receive data and to two sequences of fixed pattern and receive data for each chip; addition of the multiplication products on the chip-by-chip basis in an equivalent of two sequences for each of I and Q channels; and addition of the squared addition result for each of the I and Q channels to figure out two sequences of square correlated values.

14. The method of spread spectrum communication, as claimed in claim 13, wherein the largest square correlated value for each frame is figured out by using the larger of square correlated values in said two sequences, and it is judged that said spread-modulated fixed pattern has been received when coincidence between the interval of this largest square correlated value and the frame length has been repeated for a plurality of consecutive times.

15. The method of spread spectrum communication, as claimed in claim 1, wherein said fixed frame is a unique word used in frame synchronization circuits.

16. A spread spectrum communication apparatus comprising:

a multiplexing circuit for multiplexing a fixed pattern over the leading edge of each frame of transmit data;

a spreading code generating circuit for generating spreading codes at a timing synchronized with said frame;

a spreading circuit for spread-modulating the transmit data multiplexed with said fixed pattern with said spreading codes and transmitting them to a counterpart station;

a correlation detecting circuit for detecting correlation between spread-modulated signals received from said counterpart station and a code sequence same as said fixed pattern;

a dispreading code generating circuit for generating, if said fixed pattern is detected by said correlation detection, a dispreading code at a timing synchronized with said frame; and a dispreading circuit for despread-modulating said spread-modulated signals with said despread-modulated signals.

17. A spread spectrum communication apparatus, as claimed in claim 16, wherein a code length and a bandwidth expansion factor for said spreading codes can be set independent of each other.

18. A spread spectrum communication apparatus, as claimed in claim 17, wherein a ratio between said code length and said bandwidth expansion factor is variable.

19. A spread spectrum communication apparatus comprising:

a multiplexing circuit for multiplexing a fixed pattern over the leading edge of each frame of transmit data;

a spreading code generating circuit for generating spreading codes sat a timing synchronized with said frame;

a spreading code control circuit for controlling the code length and the bandwidth expansion factor of said spreading codes to prescribed values;

a spreading circuit for spread-modulating the transmit data multiplexed with said fixed pattern with said spreading codes;

a modulating/demodulating circuit for transmitting control signals for said code length and bandwidth expansion factor to a counterpart station along with said spread-modulation;

a correlation detecting circuit for detecting correlations between spread-modulated signals received from said counterpart station and a code sequence same as said fixed pattern;

a despreading code generating circuit for generating, if said fixed pattern is detected by said correlation detection, a dispreading code at a timing synchronized with said frame; and a despreading circuit for despread-modulating said spread-modulated signals with said despread-modulated signals, wherein:

the spreading code control circuit of the transmitting station is for controlling the code length and the bandwidth expansion factor of said spreading codes to prescribed values, and the spreading code control circuit of the receiving station is for controlling the code length and the bandwidth expansion factor of said dispreading codes on the basis of received said control signals.

20. A spread spectrum communication apparatus, as claimed in claim 19, wherein the control of said code length and bandwidth expansion factor is such that at first said bandwidth expansion factor is set to a prescribed optimal value and said code length to a short value, and said code length is extended on the basis of the reception characteristics of said counterpart station.

21. A spread spectrum communication apparatus, as claimed in claim 20, wherein said optimal value satisfies the required system parameters and optimizes the efficiency of frequency use.

22. A spread spectrum communication apparatus, as claimed in claim 19, wherein said reception characteristics mean that the SN ratio or BER of said control signals is not inferior to a prescribed value.

23. A spread spectrum communication apparatus, as claimed in claim 19, wherein said control signals are on a carrier of a prescribed frequency modulated by a prescribed system independent of said spread-modulation.

24. A spread spectrum communication apparatus, as claimed in claim 23, wherein the carrier of said prescribed frequency is arranged beside the transmit spectrum of said spread-modulation.

25. A spread spectrum communication apparatus, as claimed in claim 16, wherein said correlation detecting circuit consists of:

a multiplication circuit for multiplying spread-modulated spread-modulated signals received from said counterpart station and multiplication coefficients of the same code sequence as said fixed pattern on two mutually orthogonal channels for each bit;

an addition circuit for adding the multiplication products on the chip-by-chip basis;

a square adding circuit for calculating the sum of squares from said results of addition; and a judging circuit for comparing said sum of squares with a prescribed value, and determining the largest square correlated value for each frame.

26. A spread spectrum communication apparatus, as claimed in claim 16, wherein said judging circuit detects coincidence between the generation interval of said largest square correlated value and the frame interval, and judges that said fixed pattern has been received when said coincidence has been repeated for a plurality of consecutive times.

27. A spread spectrum communication apparatus, as claimed in claim 16, wherein said fixed pattern differs with each of said transmit data in the two sequences of the mutually orthogonal I channel and Q channel.

28. A spread spectrum communication apparatus, as claimed in claim 27, wherein said correlation detection circuit has, separately for the two sequences, comprising said multiplication circuit and adding circuit for the I channel and said multiplication circuit and adding circuit for the Q channel, and also two of said square adding circuits, wherein each multiplication circuit has multiplication coefficients corresponding to two sequences of transmit/receive data and to two sequences of fixed pattern, and the square adding circuits figure out two sequences of square correlated values by adding the squared addition result for each of the I and Q channels.

29. A spread spectrum communication apparatus, as claimed in claim 28, wherein the largest square correlated value for each frame is figured out by using the larger of square correlated values in said two sequences, and it is judged that said spread-modulated fixed pattern has been received when coincidence between the interval of this largest square correlated value and the frame length has been repeated for a plurality of consecutive times.

30. A spread spectrum communication apparatus, as claimed in claim 16, wherein said fixed frame is a unique word used in frame synchronization circuits.

* * * * *